US010533853B2

(12) United States Patent
Hart et al.

(10) Patent No.: US 10,533,853 B2
(45) Date of Patent: Jan. 14, 2020

(54) THREE-DIMENSIONAL PHOTOGRAMMETRY SYSTEM AND METHOD

(71) Applicant: TARGET BRANDS, INC., Minneapolis, MN (US)

(72) Inventors: Brian Matthew Hart, Minneapolis, MN (US); Kirby Brian Johnson, Saint Paul, MN (US)

(73) Assignee: TARGET BRANDS, INC., Minneapolis, MN (US)

( * ) Notice: Subject to any disclaimer, the term of this patent is extended or adjusted under 35 U.S.C. 154(b) by 0 days.

(21) Appl. No.: 16/114,844

(22) Filed: Aug. 28, 2018

(65) Prior Publication Data

US 2019/0063918 A1 Feb. 28, 2019

Related U.S. Application Data

(60) Provisional application No. 62/551,404, filed on Aug. 29, 2017.

(51) Int. Cl.
*G01C 11/02* (2006.01)
*G03B 35/26* (2006.01)
(Continued)

(52) U.S. Cl.
CPC ............... *G01C 11/02* (2013.01); *G01C 3/02* (2013.01); *G01D 11/30* (2013.01); *G03B 21/145* (2013.01);
(Continued)

(58) Field of Classification Search
USPC ........................................................ 396/325
See application file for complete search history.

(56) References Cited

U.S. PATENT DOCUMENTS

| 5,915,132 A | 6/1999 | Counts, Jr. |
| 6,343,184 B1 | 1/2002 | Huebner |

(Continued)

OTHER PUBLICATIONS

"3D Copysystems", printed from www.3dcopysystems.com/004. html, publicly available at least as early as Mar. 13, 2016, per http://web.archive.org (1 page).

(Continued)

*Primary Examiner* — Clayton E. LaBalle
*Assistant Examiner* — Warren K Fenwick
(74) *Attorney, Agent, or Firm* — JoAnn M. Seaton; Griffiths & Seaton PLLC

(57) ABSTRACT

A method of using a photogrammetry system to produce a three-dimensional image representation includes placing an object in the photogrammetry system, illuminating only a plurality of polarized lights, capturing a polarized image capture set of the object using a plurality of cameras while only the plurality of polarized lights are illuminated, and sending the polarized image capture set to the at least one computer processor. The method further comprises illuminating only a plurality of non-polarized lights, capturing a non-polarized image capture set of the object from the plurality of cameras while only the non-polarized lights are illuminated, and sending the non-polarized image capture set to the at least one computer processor. The method still further comprises using the at least one computer processor to generate a three-dimensional image representation of the object includes comparing the polarized image capture set and the non-polarized image capture set.

20 Claims, 15 Drawing Sheets

(51) Int. Cl.
  *G06T 17/05* (2011.01)
  *H04N 13/243* (2018.01)
  *G03B 21/14* (2006.01)
  *G01D 11/30* (2006.01)
  *G01C 3/02* (2006.01)
  *G06Q 30/06* (2012.01)

(52) U.S. Cl.
  CPC ......... *G03B 35/26* (2013.01); *G06Q 30/0643* (2013.01); *G06T 17/05* (2013.01); *H04N 13/243* (2018.05)

(56) References Cited

U.S. PATENT DOCUMENTS

| | | | |
|---|---|---|---|
| 6,834,960 | B2 | 12/2004 | Dbjay |
| 8,462,206 | B1 | 6/2013 | McGuire et al. |
| 8,526,802 | B1 | 9/2013 | Starns |
| 10,122,997 | B1 | 11/2018 | Sheffield et al. |
| 10,386,184 | B2 * | 8/2019 | Hart .................. G01C 3/02 |
| 2004/0246333 | A1 | 12/2004 | Steuart, III |
| 2012/0293632 | A1 | 11/2012 | Yukich |
| 2016/0065798 | A1 | 3/2016 | Evans |
| 2016/0202599 | A1 | 7/2016 | Bochenek |
| 2016/0261850 | A1 | 9/2016 | Debevec et al. |
| 2016/0360184 | A1 | 12/2016 | Tausch et al. |
| 2016/0381257 | A1 | 12/2016 | Kuo |
| 2016/0381261 | A1 | 12/2016 | Bontrager et al. |
| 2017/0154462 | A1 * | 6/2017 | von Cramon ........... G06T 17/20 |
| 2018/0002035 | A1 | 1/2018 | Neely |
| 2018/0234627 | A1 | 8/2018 | Kim |
| 2018/0332234 | A1 | 11/2018 | Doig |
| 2018/0338129 | A1 | 11/2018 | Helj et al. |

OTHER PUBLICATIONS

"Ten 24 3D Scan Store", printed from http://ten24.info/about-us/, publicly available at least as early as Oct. 16, 2015, per http://web.archive.org (5 pages).

"The Source of Photogrammetry We Build 3D Scanning Rigs", printed from http://ir-ltd.net/, publicly available at least as early as Mar. 31, 2009, per http://web.archive.org (8 pages).

"Geodesic Dome Studded with Cameras to 3D-Scan Anything Inside", printed from http://makezine.com/2016/09/26/making-a-pizza-box-midi-controller-with-conductive-paint/, publicly available at least as early as Nov. 27, 2016 (14 pages).

"Custom Horizontal Photogrammetry Rig", printed from www.imgrum.net/media/1202635681149063743_25756635, publicly available at least as early as Sep. 26, 2016 (2 pages).

Liszewski, Andrew, "A Dome Packed with 480 Cameras Capture Detailed 3D Images in Motion", printed from http://gizmodo.com/a-dome-packed-with-480-cameras-captures-detailed-3d-ima-1608263411, posted on Jul. 21, 2014 (3 pages).

* cited by examiner

THREE-DIMENSIONAL PHOTOGRAMMETRY SYSTEM AND METHOD

CROSS-REFERENCE TO RELATED APPLICATION

This application is a non-provisional application of and claims priority under 35 U.S.C. § 119 to U.S. Provisional Patent Application No. 62/551,404, filed Aug. 29, 2017, which is incorporated herein by reference.

BACKGROUND OF THE INVENTION

Consumers continue to enjoy online shopping due in part to the ability to shop from nearly any location, including their home, at nearly any time. However, product photographs oftentimes do not provide a consumer with a level of information about a product that is sufficient to convince a consumer to purchase an item and/or is sufficient to increase consumer comfort with decisions to purchase merchandise online. This is especially true in the areas of personal articles, such as apparel or footwear, and household décor items, but also holds true for nearly any type of merchandise available for purchase online.

To provide consumers with more complete photographic representations of products, some online retailers provide manipulatable three-dimensional images, that is, images that can be viewed from any vantage points surrounding the image upon a consumer turning and rotating the image to simulate such vantage points. Generally speaking, such three-dimensional images are stitched together from a large variety of photographs of an item using a variety of photogrammetry techniques and/or existing photogrammetry software programs. However, considering the number of images needed to prepare a three-dimensional images multiplied by the hundreds, if not thousands or more, products sold online by a typical online retailer, the time typically required to capture such photographs to create three-dimensional images is often impractical for use on more than a select number of products. In addition, many of these photogrammetry techniques do not fully represent texture, finish, etc. or other finer points of merchandise that are necessary to more completely allow a potential consumer to inspect the merchandise online before making a purchase or a purchase decision.

SUMMARY

One embodiment of the invention relates to a method of using a photogrammetry system including placing an object in the photogrammetry system, wherein the photogrammetry system includes: a support frame assembled about a center focal point, the object being placed near the center focal point, a plurality of lights each being supported by the support frame and directed toward the center focal point. The plurality of lights includes a plurality of polarized lights, and a plurality of non-polarized lights. The photogrammetry system further includes a plurality of cameras each coupled to the support frame at a different positions and at least one computer processor in communication with each one of the plurality of cameras and the plurality of lights. Each of the one of the plurality of cameras having lenses directed toward the center focal point. The method further comprises illuminating only the plurality of polarized lights of the plurality of lights, substantially simultaneously capturing a polarized image of the object from each of the cameras while only the plurality of polarized lights of the plurality of lights are illuminated, wherein the captured polarized images collectively defining a polarized image capture set, and sending the polarized image capture set to the at least one computer processor. The method further comprises illuminating only the plurality of non-polarized lights of the plurality of lights, substantially simultaneously capturing a non-polarized image of the object from each of the cameras while only the non-polarized lights of the plurality of polarized lights are illuminated, wherein the captured non-polarized images collectively defining a non-polarized image capture set, sending the non-polarized image capture set to the at least one computer processor, and using the at least one computer processor to generate a three-dimensional image representation of the object includes comparing the polarized image capture set and the non-polarized image capture set such that the three-dimensional image representation depicts geometry and surface texture of the object about all sides of the object. Other photogrammetry systems, assemblies, and associated methods are also described herein.

BRIEF DESCRIPTION OF THE DRAWINGS

Embodiments of the invention will be described with respect to the figures, in which like reference numerals denote like elements, and in which.

DETAILED DESCRIPTION

Figure 1:
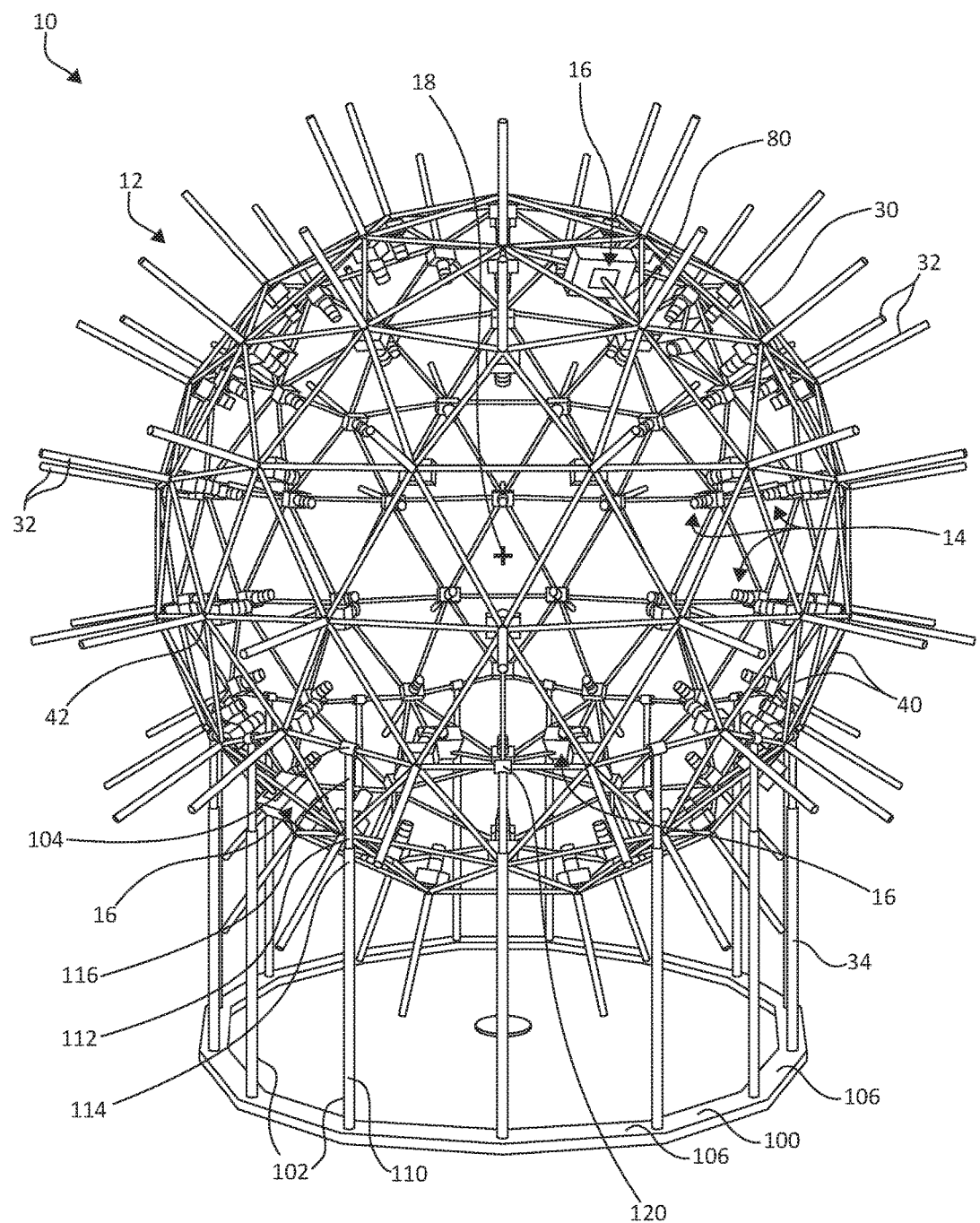
FIG. 1 is a front perspective view illustration of a photogrammetry system, according to one embodiment of the present invention.

The following detailed description of the invention provides example embodiments and is not intended to limit the invention or the application and uses of the invention. Furthermore, there is no intention to be bound by any theory presented in the preceding background of the invention or the following detailed description of the invention. Relational terms herein such a first, second, top, bottom, etc. may be used herein solely to distinguish one entity or action from another without necessarily requiring or implying an actual such relationship or order. In addition, as used herein, the terms "about" and "substantially" apply to all numeric values or descriptive terms, respectively, and generally indicate a range of numbers or characteristics that one of skill in the art would consider equivalent to the recited values or terms, that is, having the same function or results.

This innovation provides a photogrammetry system allowing for near instant capture of full image data sets of an object configured to be stitched together to form a three-dimensional, photo-based representation of an object. The photogrammetry system provides for a substantially spherically positioned array of cameras directed toward a center focal point of the system for capturing a set of images of an object selectively placed about or near center focal point. The photogrammetry system provides a support frame and camera support arms for supporting the cameras. Each support arm is coupled to a camera at an interior end thereof. The position of each camera relative to the object is readily adjusted by sliding each support arm radially inwardly or outwardly relative to the center focal point and, therefore, relative to the object positioned at or near the center focal point.

In one example, the support frame is formed as a spherical polyhedron, such as a geodesic polyhedron, and each support arm extends through a joint member formed at each intersection of support frame struts forming the geodesic polyhedron. In this manner each camera is supported at a substantially the same range of radial distances from the center focal point and is configured to fire near simultaneously such that an entire set of images used to construct a high-quality, photo-based, three-dimensional representation of an object can be captured in a relatively short period of time.

In one example, support frame additionally statically supports a plurality of projectors substantially equally spaced about the center focal point and configured to project a visual noise onto the object for image capture. In one example, the support frame additionally supports lights along the length of its struts for facilitating image capture, such as a first plurality of light that are non-polarized and second plurality of lights that are polarized, in one embodiment. Each plurality of polarized or non-polarized lights are independently controlled allowing just polarized or non-polarized lights to be illuminated at a given time and/or for all lights to be illuminated simultaneously. The projectors and lights allow multiple image sets to be captured, such as a noise-projected image capture set, a polarized image capture set, and a non-polarized image capture set, which when layered with each other collectively produce a three-dimensional photo-based representation of an object having contour, texture, and visual attributes that very closely resemble the actual object being photographed. In one example, the three-dimensional photo-based representation is of sufficient quality for use on a retail website where potential consumers wish to be able to fully appreciate the visual qualities, texture, etc. of a product before deciding whether to purchase the same.

Turning to the Figures, FIG. 1 illustrates one example of a photogrammetry system 10, in accordance with the present invention. Photogrammetry system 10 includes a rig 12, a plurality of cameras 14, and, in one example, a plurality of projectors 16. Rig 12 provides an encompassing support system for maintaining cameras 14 in a plurality of configurations all pointing toward a center focal point 18 of rig 12, for more expeditiously capturing photographs of an object 20 (see FIGS. 11-15) placed on or near center focal point 18 than prior art systems. In one example, rig 12 provides support for cameras 14 at set points about center focal point 18 in substantially all directions about center focal point 18, such that each camera support is positioned at a substantially identical distance from center focal point 18 of rig 12. Rig 12 further provides for radial adjustment of the distance each of cameras 14 is positioned from center focal point 18 while maintaining angular spacial relationships of each of cameras 14 relative to one another.

Figure 2:
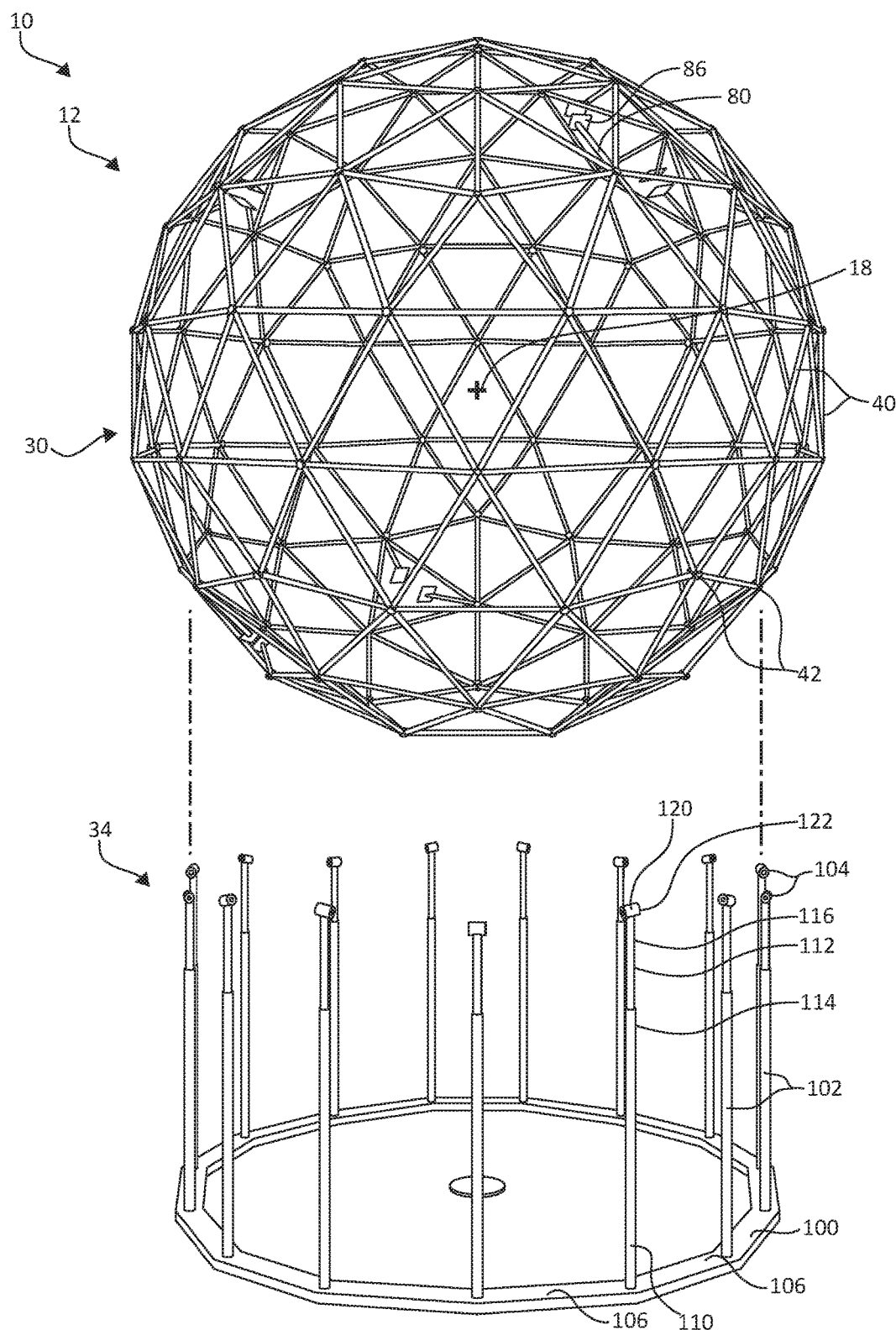
FIG. 2 is an exploded, front perspective view illustration of a support frame and stand of the photogrammetry system of FIG. 1, according to one embodiment of the present invention.

As illustrated in the embodiment of FIG. 2, in one example, rig 12 includes a support frame 30, support arms 32, and a stand 34. Support frame 30 is generally spherical in overall shape, but is formed of a plurality of linear members or struts 40 meeting at joint members 42, for example as a spherical polyhedron shape. The number of struts 40 and joint members 42 can vary. In one embodiment, the more struts 40 and joint members 42 forming support frame 30 generally translates to more cameras 14 positioned on support frame 30 and, therefor, to a greater degree of detail being available for the final three-dimensional image representation. In one example, support frame 30 is formed as a geodesic polyhedron, that is, a convex polyhedron where struts 40 are arranged into triangles, and the triangles are arranged relative to one another to approximate a sphere. In one example, where support frame 30 is a geodesic polyhedron having icosahedral symmetry, struts 40 are arranged such that six triangles intersect at each joint member 42 except for twelve of joint members 42 where five triangles intersect. In one example, support frame 30 is a truncated icosahedron with struts 40 forming pentagonal and hexagonal shapes that are further divided into triangle subdivisions by additional ones of struts 40. In one embodiment, the resultant support frame 30 defines over about eighty, for example, over about ninety vertices of struts at joint members 42. Accordingly, in one embodiment, where cameras 14 are each coupled to a different joint member 42, support frame 30 is coupled to over about eighty, for example, over about ninety cameras 14.

Figure 3:
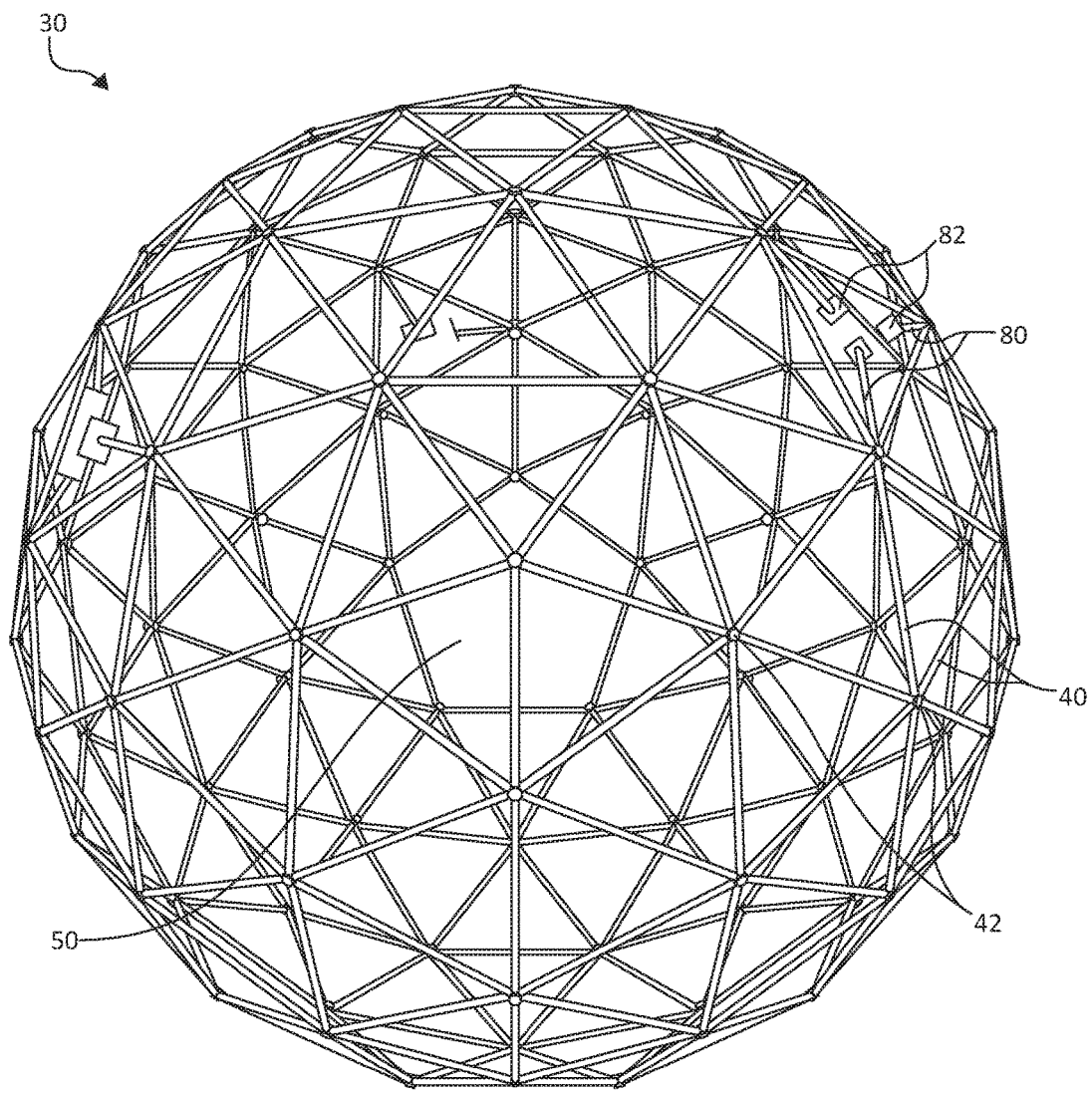
FIG. 3 is a top view illustration of a support frame of the photogrammetry system of FIG. 1, according to one embodiment of the present invention.

Referring to the bottom view of support frame 30 in FIG. 3, in one embodiment, support frame 30 is substantially continuous about center focal point 18 other than at a bottom portion thereof, where struts 40 are not formed to define a bottom frame opening 50 to allow objects 20 (FIG. 9-15) to be loaded into support frame 30. In such an example, one or more vertices, and therefor, joint members 42 are eliminated to form bottom frame opening 50. In one example, where support frame 30 is formed as truncated icosahedron further divided into triangular sub-shapes with bottom frame opening 50 removing a vertices or joint member 42 that would otherwise be at bottom of support frame 30, support frame 30 includes ninety-one joint members 42. For example, as illustrated, five struts 40 that would otherwise be included in support frame 30 are eliminated, leaving bottom frame opening 50 formed therein in the shape of a pentagon. In other embodiments, other sizes and shapes of bottom frame opening 50 and/or numbers of eliminated struts 40 are contemplated depending upon desired use, etc.

Struts 40 and joint members 42 can be formed in a number of other configurations, such as where each of joint members 42 is formed at a substantially identical distance from the center focal point 18 while, in other embodiments, joint members 42 are spaced at non-equal distances from center focal point 18. In one embodiment, joint members 42 are spaced at equal distances between adjacent joint members 42. For example, struts 40 and joint members 42 are arranged as a tetrahedron, icosahedron, truncated icosahedron, dodecahedron, octahedron, etc. In one example, struts 40 are arched or curved, such that struts 40 are arranged to collectively form a more nearly spherical or true spherical form about center focal point 18, while in other embodiments, struts 40 are entirely or more nearly linear.

The size of struts 40, and, therefore, of support frame 30 as a whole is selected to correspond with sizes of objects 20 likely to be photographed therein. In one example, support frame 30 is at least six feet in overall diameter, and in one example, at least about twelve feet in overall diameter. In one example, support frame 30 is configured to allow for successful photography suitable for photogrammetry production of three-dimensional image representations for objects 20 having sizes ranging from about two inches in outermost diameter to about forty-eight inches in outermost diameter. Support frame 30 can be otherwise sized as desired to photograph other sized objects 20 or ranges of sizes of objects 20, for example, by adjusting sizes of struts 40 and/or features of cameras 14, to permit suitable photography of such objects 20.

Figure 4:
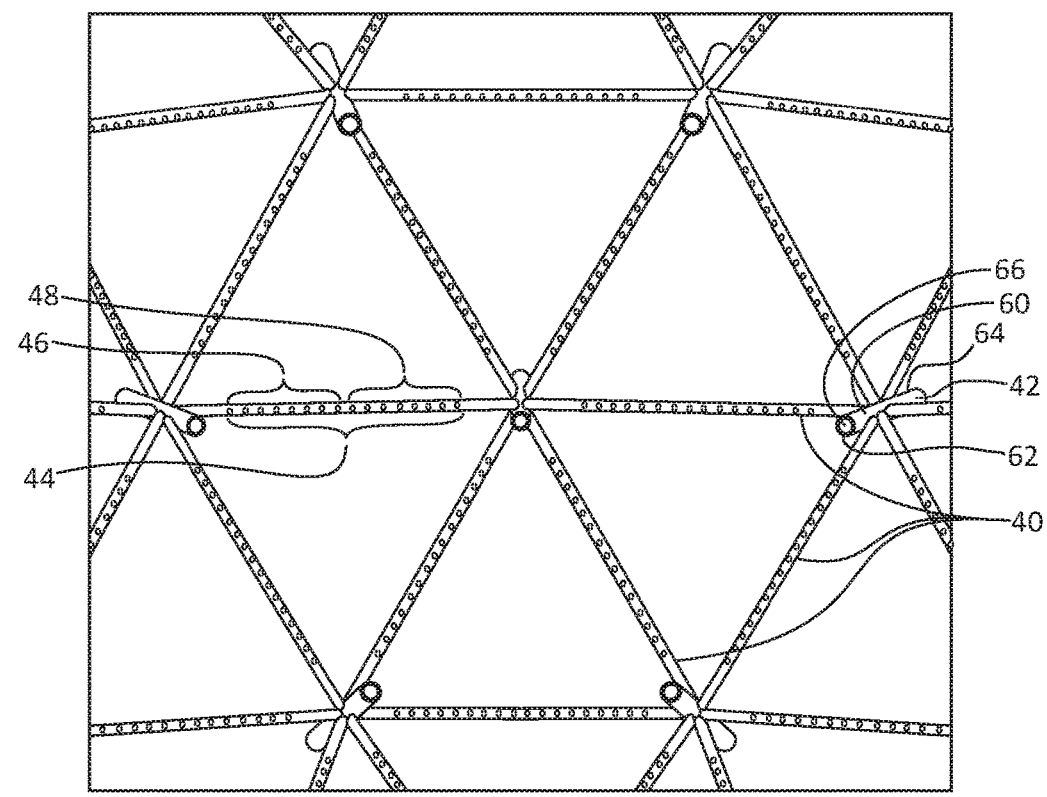
FIG. 4 is a detailed view illustration of an inside portion of the support frame, camera support arms and cameras of FIG. 1, according to one embodiment of the present invention.

In one example, each of struts 40 is formed of a rigid material, such as steel, aluminum, plastic, or other suitable material, in a hollow, tubular format. Each strut 40 includes a linear array of lights 44 extending along a length thereof facing toward center focal point 18, in one embodiment, where wiring (not shown) for all lights 44 is thread through struts 40 to a power source (not shown) and/or electrical controller (not shown). For example, as shown with additional reference to FIG. 4, the linear array of lights 44 includes a plurality of non-polarized lights 46 and a plurality of polarized lights 48. All of polarized lights 48 have the same polarization (e.g., north and south polarization or east and west polarization). While described above and generally illustrated with each strut 40 including both the plurality of non-polarized lights 46 and the plurality of polarized lights 48, in one embodiment, some of struts 40 include only the plurality of non-polarized lights 46 while other ones of the struts 40 include only the plurality of polarized lights 48

As illustrated in FIGS. 11-15, a linear array of non-polarized lights 26 extends from one end of each strut 40 to approximately a middle of strut 40 followed by a linear array of polarized lights 48 extending from the middle of strut 40 toward the other end of strut 40. Other configurations of non-polarized lights 46 and polarized lights 48 are also contemplated. Non-polarized lights 46 and polarized lights are included 48 to allow different types of images sets of object 20 to be capture to create a more fully representative three-dimensional representation of object 20 when all image capture sets are used to create such a representation as will be further described below.

Each strut 40 extends between two adjacent joint members 42. In one embodiment, such as where support frame 30 is formed as a truncated icosahedron, the ninety-one joint members 42 are formed to receive ends of five or six different struts 40 spaced circumferentially about joint member 42. In one example, joint members 42 are formed to receive support arms 32 in a linearly slidable manner in a radial direction as compared to center focal point 18. While various configurations are contemplated, in one example, each joint member 42 is formed generally as, or at least including, an open cylinder including a sidewall 60 having an interior end 62, an exterior end 64 opposite the interior end 62, and an open cavity 66 surrounded by sidewall 60 and open to each of interior end 62 and exterior end 64, as illustrated with additional reference to FIG. 4. Interior end 62 is closer to center focal point 18 than exterior end 64. In one example, a length of each joint member 42 is configured to receive support arms 32, as will be further described below, and to maintain support arm 32 in a static position during use. For instance, joint member 42 is formed with a length between about six inches and about 36 inches. In one embodiment, each joint member 42 has a length equal to about 20 inches.

In one example, open cavity 66 of each joint member 42 is positioned such that its centerline is radially aligned with center focal point 18. Open cavity 66 has an inner diameter sized to slidably receive one support arm 32. In one example, open cavity 66 includes other gripping means (not shown), etc. therein to selectively grip or release support arm 32. In one embodiment, gripping means in open cavity 66 are configured to grip and/or release support arm 32 selectively based on electrical activation from a computer, remote, or other activation control, not shown. In one embodiment, each joint member 42 is further configured to interact with one of support arms 32 in a manner translating the position of support arm 32, that is moving support arm 32 either closer to or further away from center focal point 18 selectively based on electrical activation from a computer, remote, or other activation control, and generally without need for manual adjustment. In other embodiments, support arms 32 are positioned relative to joint members 42 via at least some manual interaction.

While primarily described and illustrated as having struts 40 and joint members 42 that are substantially static in overall size and/or length, in one embodiment, joint members 42 and/or portions of struts 40 are configured to expand and/or contract upon receiving a corresponding control message to change the overall size of support frame 30 upon command. In such an embodiment, the capacity of photogrammetry system 10 is increased such that photogrammetry system 10 is configured for use with a larger size range of objects 20.

Figure 5:
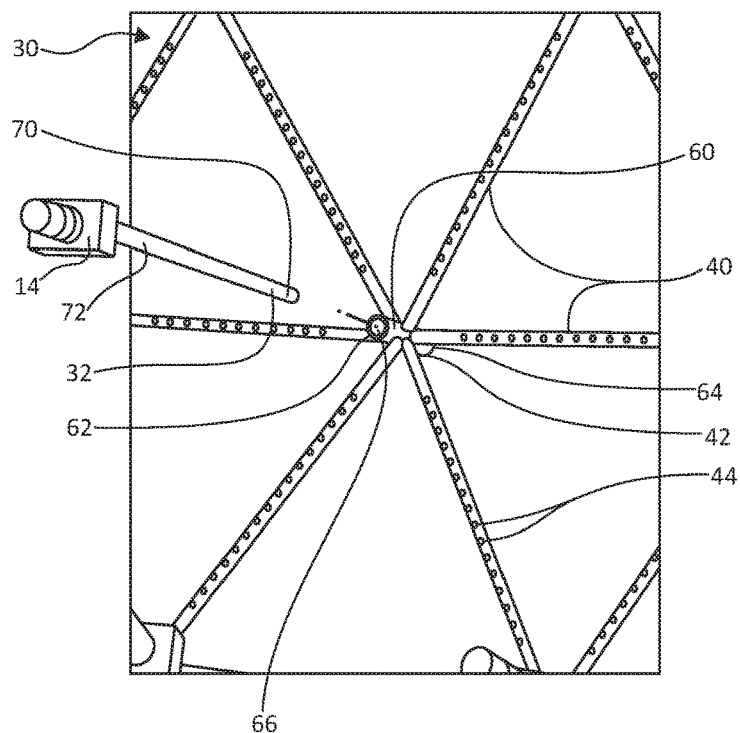
FIG. 5 is an exploded, detailed view illustration of an inside portion of the support frame of FIG. 2 along with a camera support arm and camera, according to one embodiment of the present invention.
Figure 6:
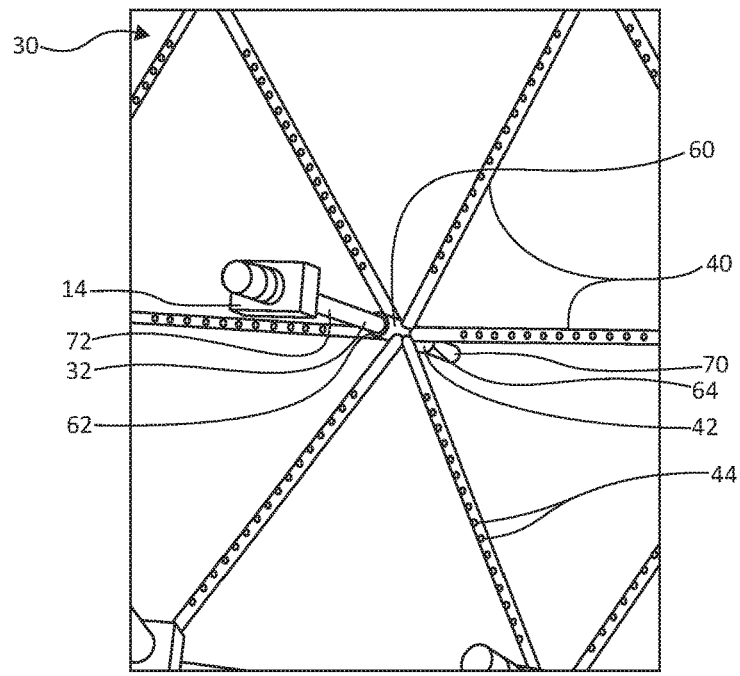
FIG. 6 is a detailed view illustration of the inside portion of the support frame, camera support arm, and camera of FIG. 5, according to one embodiment of the present invention.

Additionally, referring to the detailed views of FIGS. 5 and 6, each support arm 32 is an elongated member, such as a hollow or solid cylindrical rod, slidably received within open cavity 66 to move along a radial ray extending from center focal point 18. For example, each support arm 32 is configured to linearly slide within open cavity 66 inwardly toward center focal point 18 and outwardly away from center focal point 18. Each support arm 32 defines a free end 70 opposite center focal point 18 and a camera end 72 nearest center focal point 18. Free end 70 is generally maintained on an exterior of rig 12, that is outside the otherwise closed shape defined by rig 12. Support arms 32 are sized and configured to support cameras 14 and provide desired flexibility to a range of sizes of objects 20 to be photographed inside support frame 30. In one example, support arms 32 are adjustable along a range of between about ten inches and about 100 inches, for instance along a length of about 52.5 inches.

One of cameras 14 is secured to camera end 72 of each of support arms 32 such that camera 14 is pointed to capture an image generally at or surrounding center focal point 18. In one example, support camera 14 is coupled to camera end 72 of support arm 32 in a selectively rotatable, tiltable, and/or spinnable manner. Cameras 14 are any suitable digital capture cameras having suitable resolution and other features compatible with photogrammetry techniques employed herein. In one example, each of cameras 14 includes a similar lens, such as a 35 mm lens, a 50 mm lens, and a 100 mm lens. Each camera 14, according to one embodiment of the invention, additionally includes a professional-grade, digital single-lens reflex camera with full-frame complementary metal-oxide-semiconductor chip, such as the 50 Megapixel Canon 5DSr, for example, having no high-pass filter. However, other cameras 14 with varying specifications and features are also contemplated for use with photogrammetry system 10.

When cameras 14 are mounted to support arms 32, cameras 14 are, in one example, movable to between a first distance of about 24.5 inches from center focal point 18 of support frame 30 to a second distance of about 77 inches away from center focal point 18. However, other ranges of motion of support arms 32, and, therefore, ranges of location of cameras 14 along radial rays from center focal point 18 are also contemplated.

While generally described herein as having cameras 14 secured to support frame 30 only at joint members 42, in one embodiment, cameras 14 are additionally or alternatively coupled to struts 40 mid-member, that is between adjacent joint members 42. Other locations or configurations for mounting cameras 14 to support frame 30 are also contemplated. The known location of cameras 14 relative to each other, that is distance between object and each of cameras 14, the angle between adjacent cameras, etc. is noted for calculations, etc. for use in combining images to create an overall three-dimensional image representation of object 20.

In one example, the gripping means (not shown) of each joint member 42 is configured to selectively grip support arm 32 to prevent movement thereof when engaged therewith. In one embodiment, rig 12 is configured with means for translating each support arm 32 closer to or further away from center focal point 18 per user entry into a controller or other actuating system (not shown). In one embodiment, each support arm 32 includes demarcations, etc. to facilitate manual movement of each support arm 32 relative to its respective joint member 42 as desired based on object 20 being photographed. In addition, or in an alternative to, rotation and/or tilt of each camera 14 is manually controlled and/or electronically controlled by the controller or other actuating system.

Figure 7:
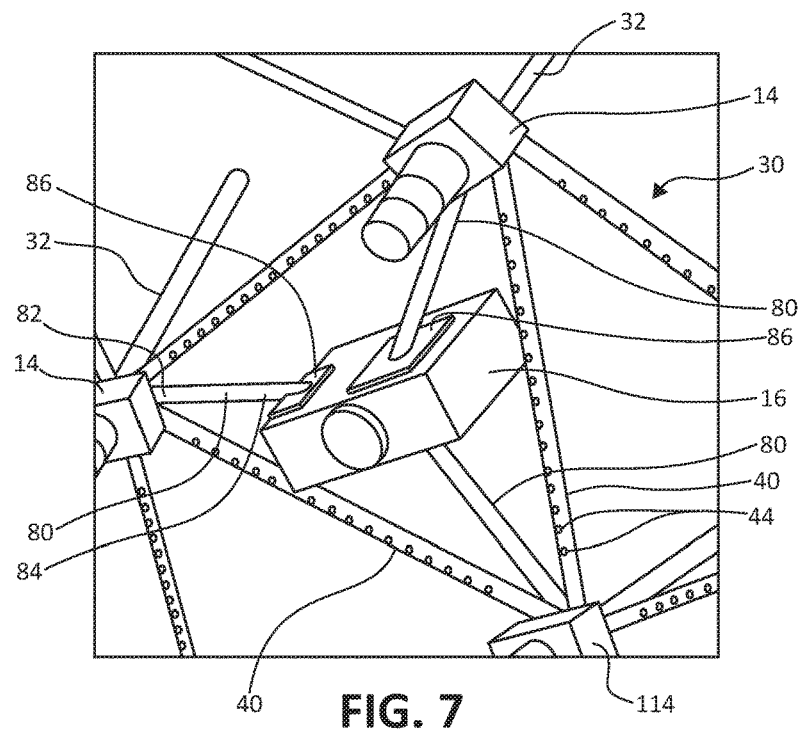
FIG. 7 is detailed view illustration of an inside portion of the support frame, camera support arms, cameras, projector, and projector support arms of the photogrammetry system of FIG. 1, according to one embodiment of the present invention.

In one example, one or more projectors 16, such as at least three projectors 16 or eight or more projectors 16 are also supported via support frame 30. Each projector 16 is configured to project a suitable visual noise, that is, image pattern (e.g., white noise), onto any object 20 held within support frame 30. Each projector 16 is directed generally toward center focal point 18 or space very near to center focal point 18, and projectors 16 are substantially spaced equidistantly about center focal point 18. In one example, each projector 16 is maintained at a substantially center point of one of the triangle shapes defined by struts 40 of support frame 30. More specifically, in one embodiment, as illustrated in FIG. 7, projector support struts 80 are used to couple projector 16 to support frame 30.

Each projector support strut 80 defines an anchor end 82 coupled to support frame 30 and a coupling end 84 opposite anchor end 82. Each projector strut 80 extends inwardly from the coupling of anchor end 82 with support frame 30, for example, at or adjacent to one of joint members 42 forming a triangle shape, toward a center of the triangle shape as defined by struts 40. Each projector support strut 80 is coupled to a coupling plate 86 or other coupling means, which, in turn, is coupled to projector 16, in one embodiment. In one example two or more, for instance, three or more, projector support struts 80 extend from support frame 30 to each projector 16. When so mounted, each projector 16 is pointed substantially direction at center focal point 18.

Support frame 30 is supported above ground, floor, or another supporting surface by stand 34, in one embodiment. Stand 34 may take on any variety of configurations and is configured to allow access to support frame 30, for example, for loading and unloading objects 20 from within support frame 30. In one example, stand 34 is static while, in another example, support frame 30 is adjustable, for instance, height adjustable, to raise and lower support frame 30 for loading.

Figure 8:
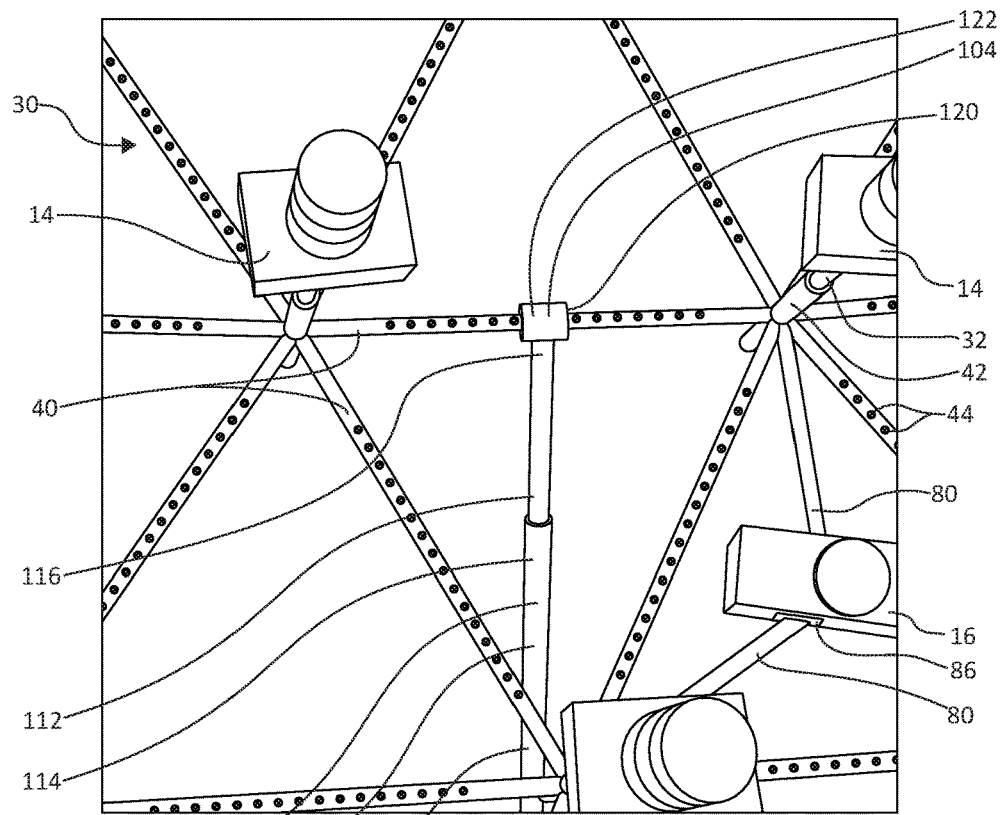
FIG. 8 is detailed view illustration of an inside portion of the support frame, camera support arms, cameras, and a portion of the stand of FIG. 1, according to one embodiment of the present invention.

One example of stand 34 is illustrated in FIGS. 1, 2, and 8 and includes a base 100, support poles 102, and coupling member 104. Base 100 contacts ground, floor, or other supporting surface providing stability to stand 34 and support frame 30. In one example base 100 is formed from one or more substantially planar plates and forms a closed shape having an overall diameter that is at least about one-half an overall diameter of support frame 30. As illustrated, base 100 is formed as a polygon, such as a pentadecagon having a serious of linear segments 106 coupled end to end to form a closed shape.

Support poles 102 extend upwardly from a top surface of base 100 to each be coupled with a different one of struts 40, for example, one of struts 40 that extends substantially horizontally or substantially parallel to base 100. In one embodiment, each support pole 102 is formed of at least two parts including a primary member 110 and a telescoping member 112. Primary member 110 extends upwardly from, or at least away from, base 100 to a free end 114 of primary member 110 that is open to an interior cavity (not shown) thereof. Telescoping member 112 is slidably received within and coupled to primary member 110 in a linearly adjustable manner. Telescoping member 112 can be slid into and out of and selectively secured in place to primary member 110 to position a free end 116 of telescoping member 112 at a variety of heights, either manually or via electronic control, to adjust the height of support frame 30.

In one example, free end 116 of telescoping member 112 is statically or otherwise secured to support frame 30. As illustrated in FIGS. 1 and 8, in one embodiment, coupling member 104 is secured to free end 116 of telescoping member and to one of struts 40 of support frame 30. For example, coupling member 104 includes a tube 120 that receives and/or otherwise wraps substantially about a circumference other outer perimeter of a corresponding one of struts 40 to securely couple stand 34 to support frame 30. Telescoping member 112 is secured to an exterior surface 122 of coupling member 104, in one embodiment.

Photogrammetry system 10 includes any suitable object support 130 for supporting object 20 above ground or floor therebelow, for example, substantially centered about center focal point 18 of support frame 30. Object support 130 may extends from any suitable base, such as a static base, and/or adjustable base, for instance, a base having an array of coupling features configured to receive object support 130 in a pegged or other suitable manner. In one example, each object support 130 includes a vertical member 132, which extends upwardly from the base through bottom frame opening 50 of support frame 30 into an interior of support frame 30, and a support features such as a support plate 134 for holding object 20 within support frame 30.

Figure 9:
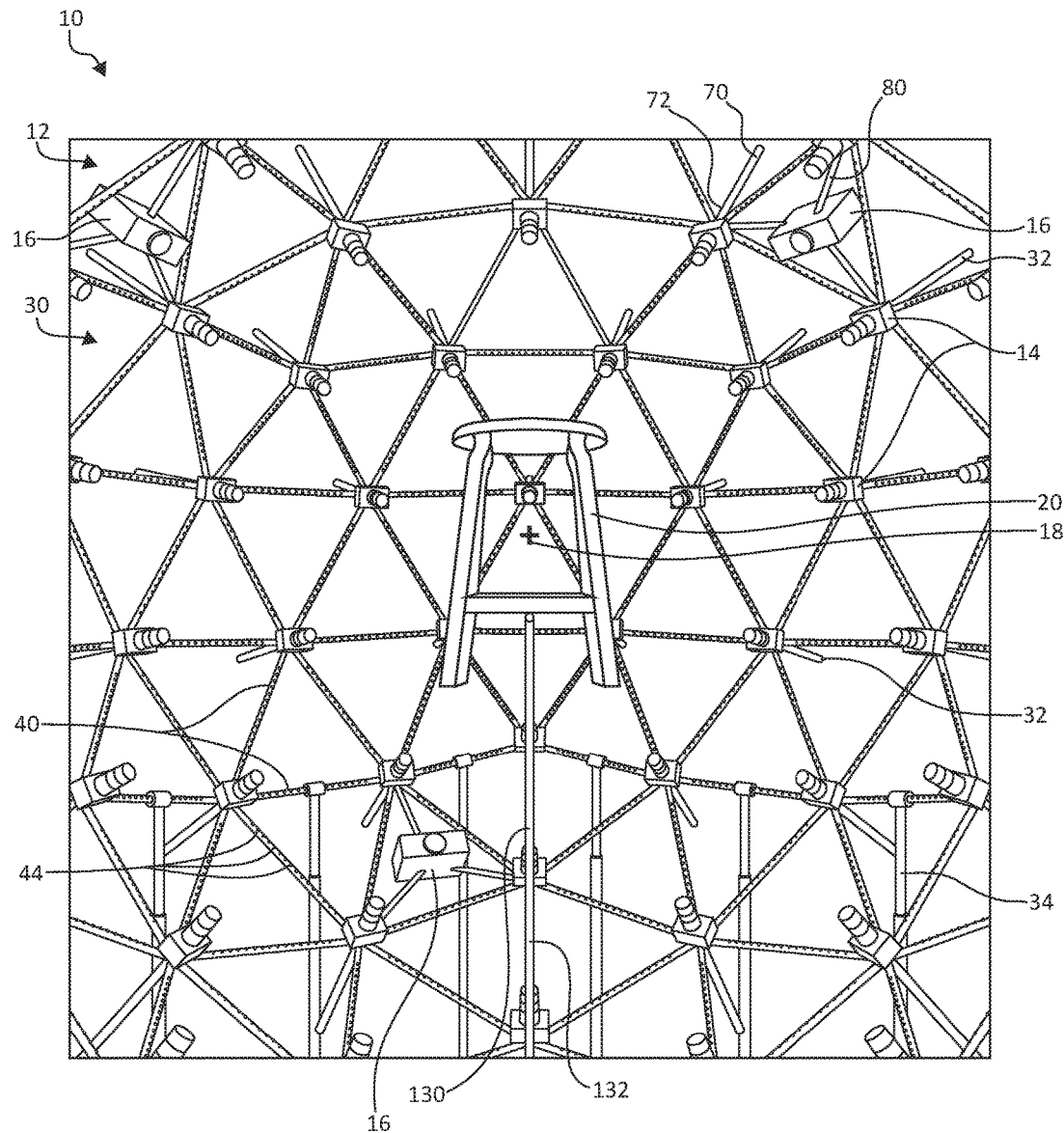
FIG. 9 is an interior view illustration of the photogrammetry system with a first object positioned therein for photographic capture, according to one embodiment.
Figure 10:
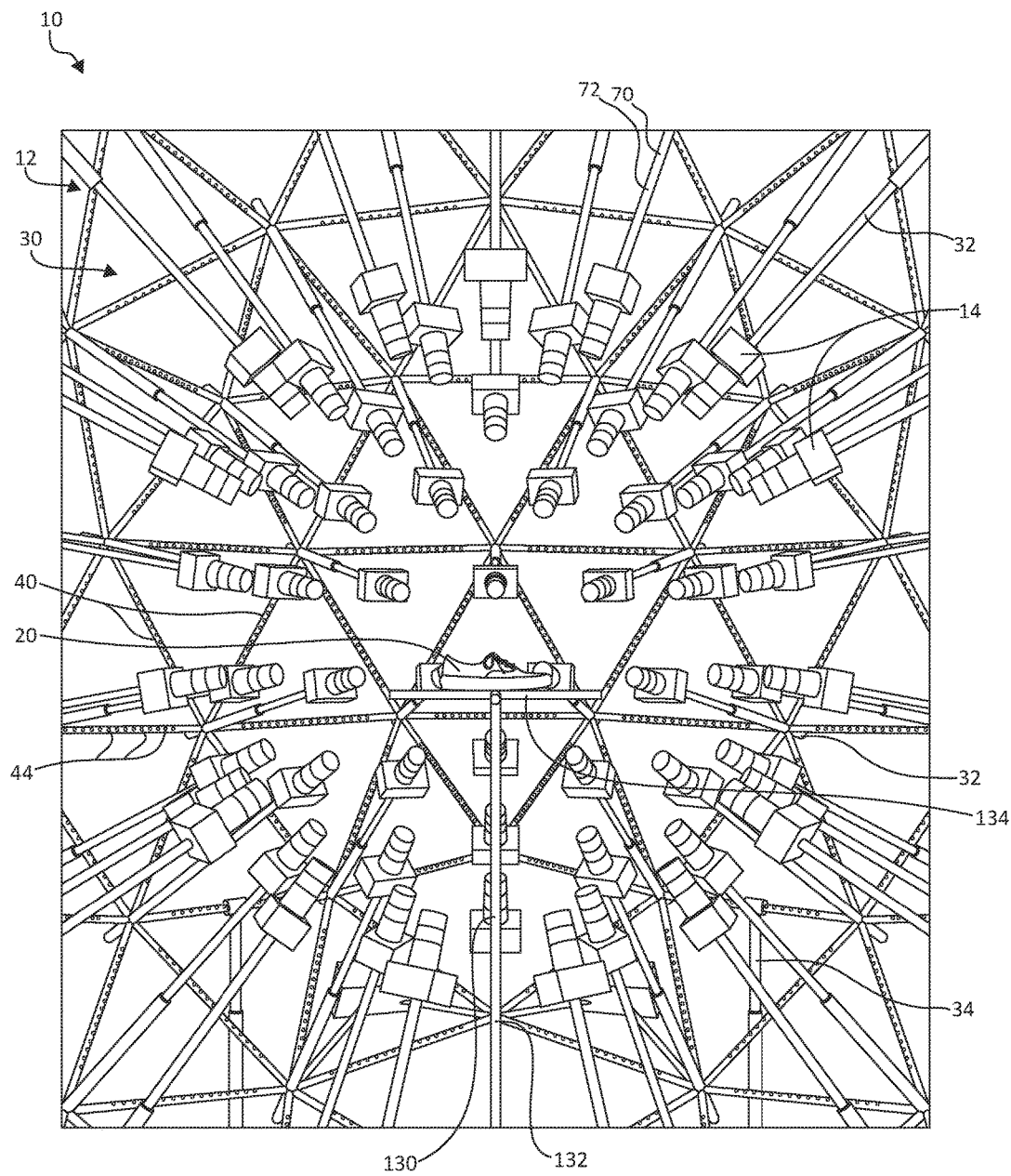
FIG. 10 is an interior view illustration of the photogrammetry system with a second object positioned therein for photographic capture, according to one embodiment.

As illustrated in FIGS. 9 and 10, the resultant photogrammetry system 10 shows use of object support 130 to position objects 20 of various sizes in support frame 30. For example, in FIG. 9, a medium or large sized object 20 is placed within support frame 30 via object support 130. Since object 20 is medium or large sized, support arms 32 are retracted such that each camera 14 is near or immediately adjacent joint member 42 and free end 70 of support arm 32. In this manner, free end 70 of support arm 32 extends radially outwardly from joint member 42 on an exterior side of support frame 30. Cameras 14 are positioned a distance away from center focal point 18 determined to provide full photographic coverage of object 20 positioned within support frame 30. In one embodiment, the distance each camera 14 is spaced from center focal point 18 is determined by pre-calibrating photogrammetry system 10 prior to operationalizing photogrammetry system 10. For example, the camera distance in combination with a lens choice is substantially optimized to maximize the sharpness of objection pixels, that is, pixels that described the item being modeled, throughout the deepest depth of focus range within the frame of any given camera as well as the maximum object pixels filling the frame of any given camera. Other considerations are also contemplated in selecting a distance between each camera 14 and center focal point 18.

FIG. 10 illustrates a different configuration, where object 20 is a relatively small object 20 in the range of object sizes that photogrammetry system 10 is configured to capture. In such an embodiment, support arms 32 are linearly translated relative to joint members 42 toward center focal point 18, and therefore, closer to small object 20. Once again, the distance cameras 14 are positioned relative to object 20 and/or center focal point 18, is governed by the same principles as described above with respect to FIG. 9.

While support arms 32 are shown fully retracted in FIG. 9 and fully protruding in FIG. 10 for illustrative purposes, support arms 32 may be positioned at any number of intermediate positions between fully retracted as shown in FIG. 9 and fully or near fully protruding as shown in FIG. 10. Other methods of moving cameras 14 closer to and further away from center focal point 18 are also contemplated.

Figure 11:
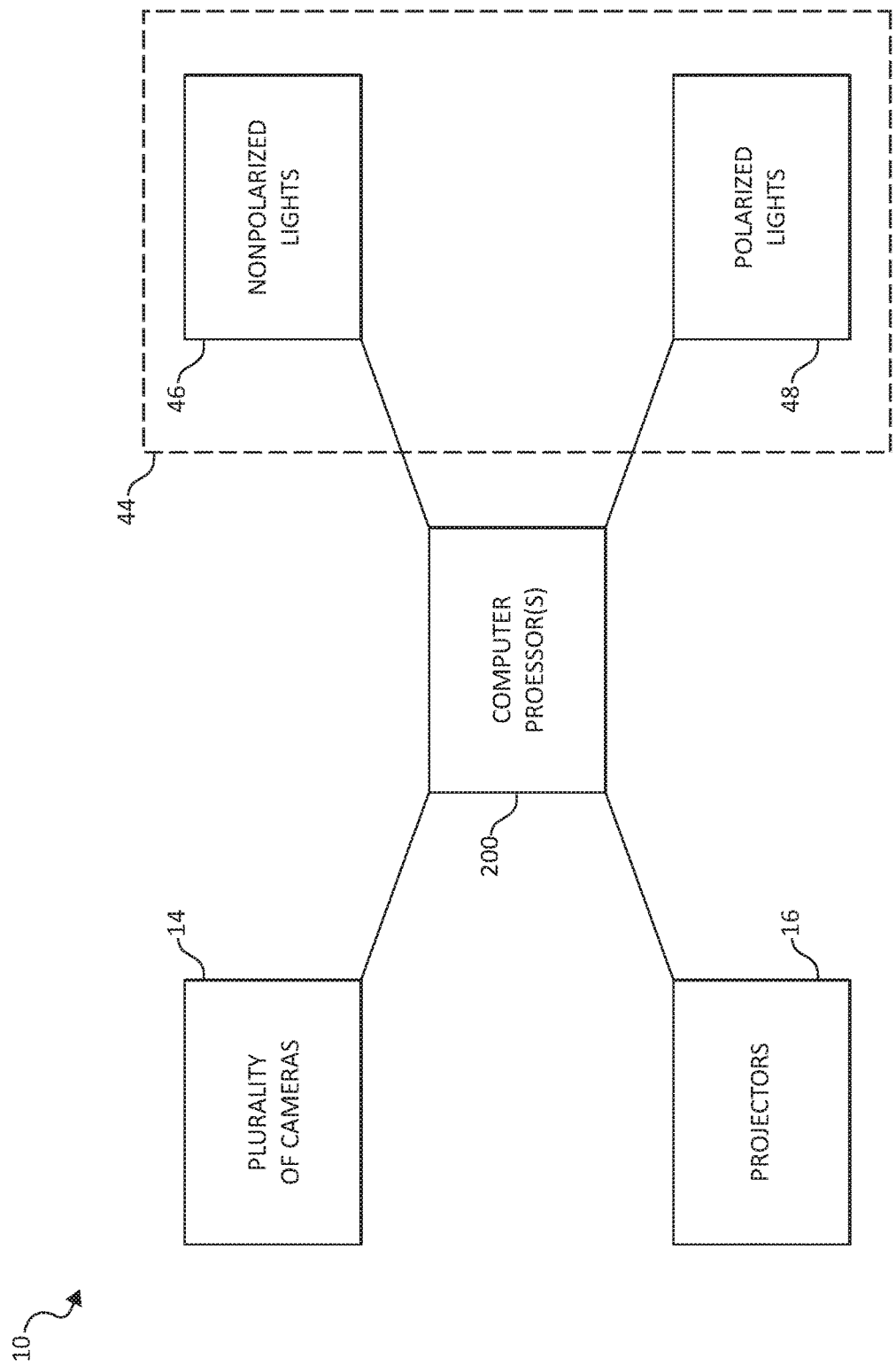
FIG. 11 is a schematic illustration of the photogrammetry system, according to one embodiment.

In one example, as generally indicated in the schematic illustration of FIG. 11, cameras 14 and other portions of photogrammetry system 10, e.g., the plurality of cameras 14, projectors 16, non-polarized lights 44, and/or polarized lights 46, are coupled to at least one computer processor 200 to allow for rapid collection of images collected by cameras 14 during one or more image capture sequences and/or to send images to a server or database for storage and/or later access. In one example, photogrammetry system 10 allows a single object 20 to be photographed under a variety of conditions, e.g., with noise from projectors 16, illumination from non-polarized lights 44, and/or illumination from polarized lights 46, in rapid form since all of cameras 14 are quickly and easily reconfigured via electronic control and projectors 16, non-polarized lights 44, and polarized lights can be remotely and electronically activated. In one example, photogrammetry system 10 allows three or more image capture sets to be completed in a much faster time frame than conventional systems.

Figure 12:
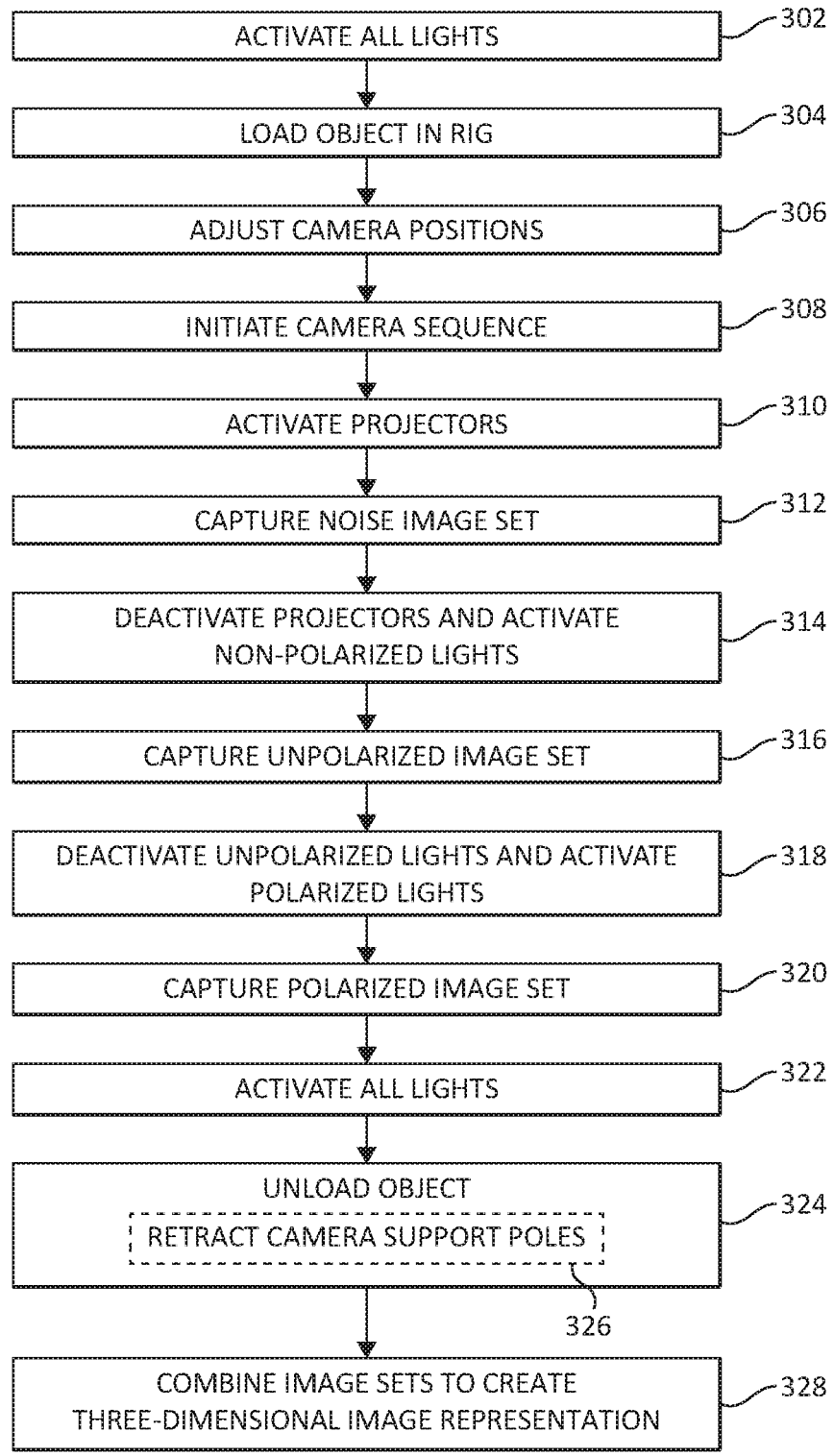
FIG. 12 is a flow chart of a method of using the photogrammetry system of FIG. 1, according to one embodiment of the present invention.
Figure 13:
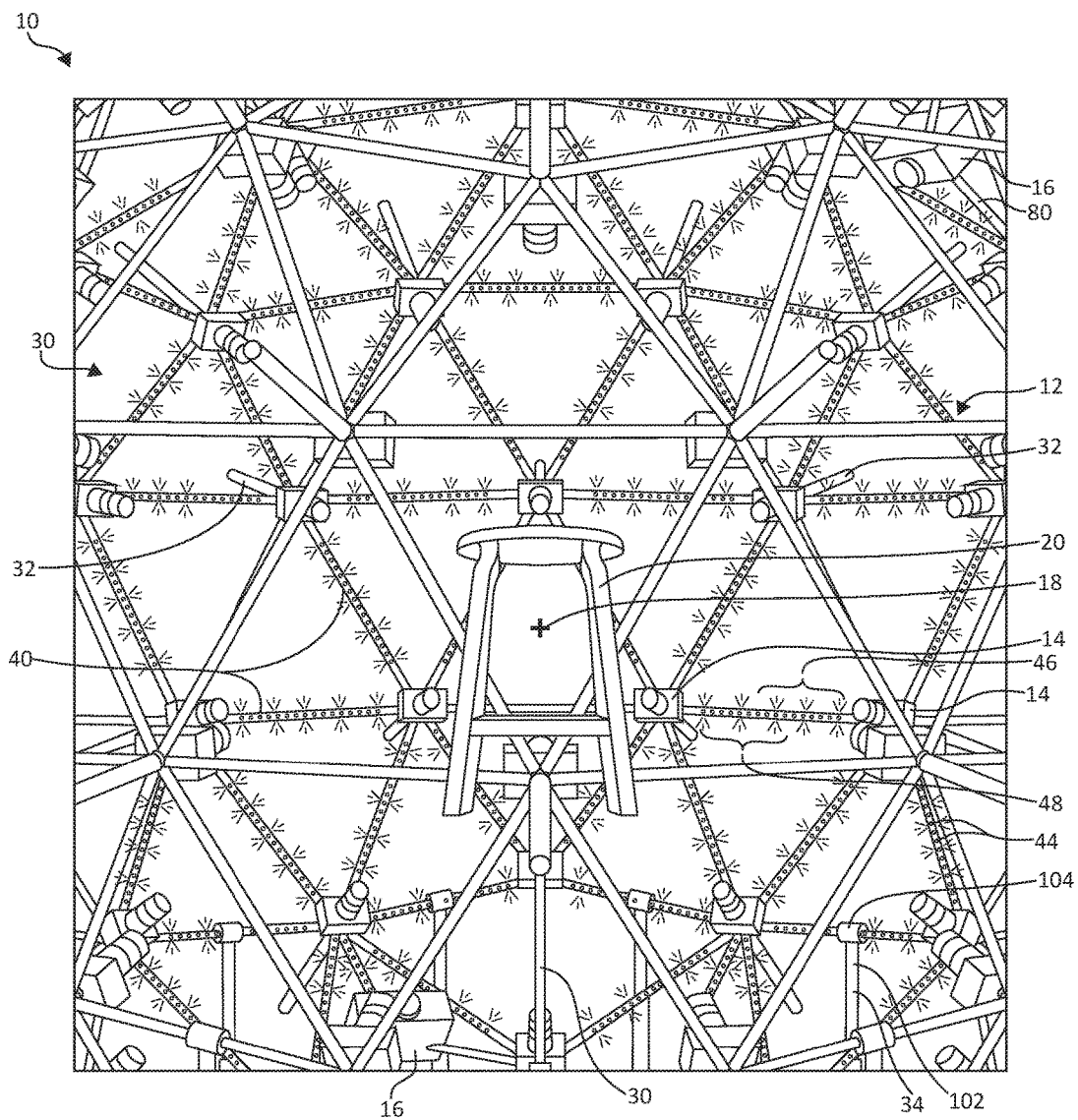
FIGS. 13-17 are each a detailed view illustration of the photogrammetry system of claim 1 with an object, according to a different step in the method of FIG. 12, according to one embodiment of the present invention.

FIG. 12 illustrates one embodiment of a method 300 of using photogrammetry system 10. In one example, all lights 44, including non-polarized lights 46 and polarized lights 48, are illuminated at 302, as generally illustrated in FIG. 13, providing working illuminations to photogrammetry system 10. Then, at 304, object 20 is loaded into rig 12 using one or more object supports 130, also as generally illustrated in FIG. 13. In one example, object support(s) 130 is height adjustable to prepare object 20 to be supported within rig 12 around or at least near center focal point 18. In one example, one object support 130 is sufficient to support object 20, while in other embodiments, additional object supports 130 are used to support object 20 based on the size of object, orientation, fragility, and/or other considerations to securely hold object 20 for photo capture. In one example, fewer objects supports 130 are generally desired to provide less structure that could obscure photo capture of object 20. In one example, during operation 304, support arms 32 and cameras 14 supported thereon are fully retracted toward support frame 30 providing maximum space to individuals configuring object supports(s) 130 and placing object 20 thereon.

In one embodiment, once object 20 is positioned for photography, then, at 306, positions of cameras 14 are adjusted. For example, support arms 32 are adjusted either manually or electronically to position each camera 14 at a substantially equal distance from center focal point 18. In this manner, cameras 14 are each positioned along an outer surface of an imaginary sphere that surrounds object 20. This consistent placement of cameras 14 makes calculation and extrapolation of a three-dimensional, photo-based image representation from a plurality of individual, conventional, still images captures by cameras 14 more accurate due to viewpoints being evenly distributed around the surface of our quasi-sphere, which generally results in creation of a more realistic three-dimensional image representation of object 20. However, in other embodiments, cameras 14 may be placed in any configuration desired, relative to support frame 30, by photographers and/or related team members thereof to achieve a resultant image, or more than one image, as desired. Adjusting the plurality of cameras 14 may also include adjusting tilt of one ore more camera 14, adjusting a lens type of one or more camera 14, adjusting a filter of one or more camera 14, replacing types of cameras 14, adjusting rotation of one or more cameras 14, etc. In one example, photogrammetry system 10 is programmed with preset configurations including, positions, etc. such that camera 14 adjustments can be completed via a single programming command or a relatively few number of programming commands as compared to control commands need for a non-preset configuration.

Figure 14:
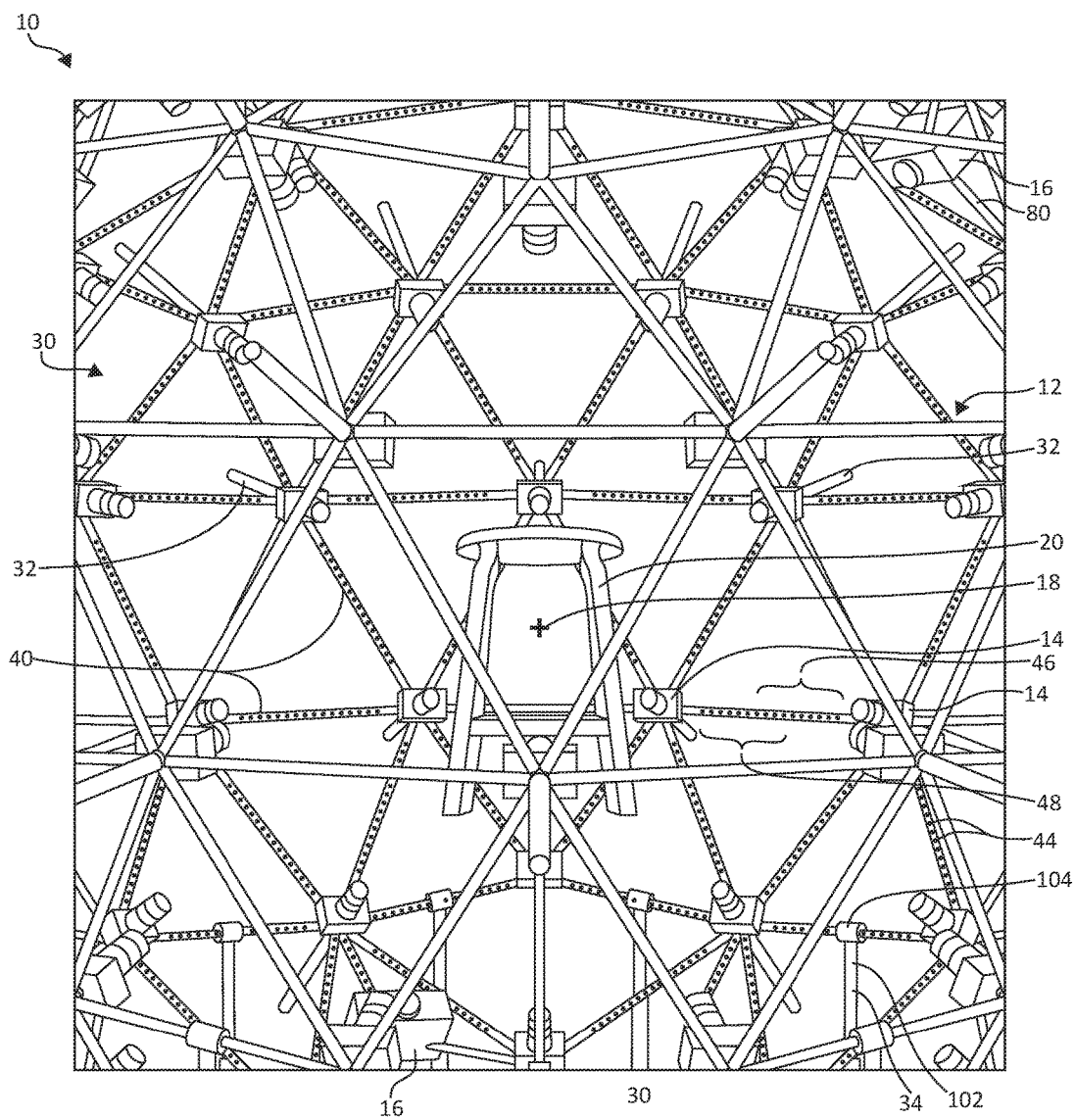
Figure 15:
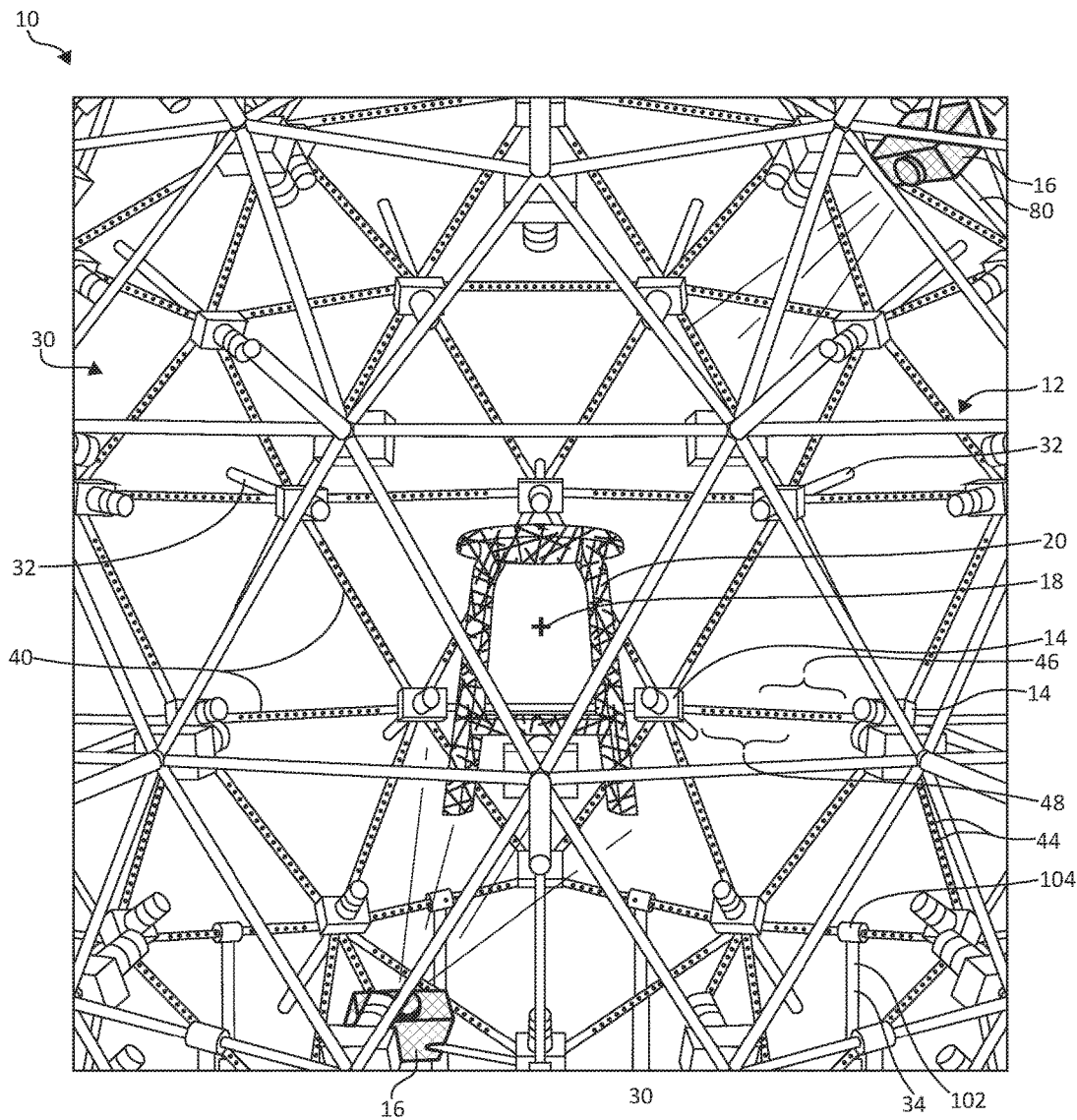

At 308, all lights 44 are turned off and image capture sequence is initiated as indicated in FIG. 14. In one embodiment, at 310 projectors 16 are activated while lights 44 remain off. As illustrated in FIG. 15, projectors 16 project a white noise or another visually textured pattern onto object 20. While FIG. 15 illustrates one projected noise pattern on object 20 for illustrative purposes, in general a noise pattern is smaller detail. While noise pattern is projected on object 20, at 312 a noise image capture set is collected by cameras 14. More specifically, each camera 14 takes a picture of object 20 from its respective position relative to object 20 creating a digital noise image of object 20 while the noise pattern in projected thereon.

In one embodiment, the projected noise is selected to enhance collection of surface specifics, especially where surfaces are glossy, glass-like, or otherwise have little texture, etc. For example, where relatively featureless surfaces are typically difficult to capture and fully represent in photogrammetry, and various methods have been developed to provide additional context to an object 20 to highlight the contour or other geometry of object 20 as opposed to other visual aspects thereof. In one embodiment of this invention, such projectors 16 projecting noise onto objects 20 is at least one example of means for more accurately collecting contour information.

In one example, the individual images in the image noise capture set are combined using photogrammetry techniques, such as a known software system, to create an object contour mesh or surface texture map representation showing the overall shapes and curvatures of object 20, but not generally showing other visual characteristics of object 20, such as color, graphics, two-dimensional ornamentation, etc. To aid in this technique, in one embodiment, each of projectors 16 projects the same noise pattern or variation thereof onto object 20 and/or projectors 16 are all positioned the same distance away from center focal point 18 to assist in making calculations to erect a surface topology or contour map corresponding to the objection. While collecting the noise image capture set is described as occurring as operation 312, any texture map or similar representation of object 20 may be generated, generally with the use of photogrammetry software, before proceeding with a remainder of method 300, after all image capture sets for object 20 are captured, or anytime therebetween or afterwards.

Noise projection is one method of creating a more realistic surface topology map for some objects 20 and provides benefits as it does not require treatments to be applied to object 20, such as having object 20 painted with a slurry or other coating, which, in turn, speeds the image capture and three-dimensional representation build allowing a large number of three-dimensional representations of a plurality of objects 20 to be achieved in a relatively short period time, as compared with other methods and/or other prior art photogrammetry systems. Noise projections are particularly of use when object 20 being captured has a challenging finish that makes surface topology difficult to assess, such as for objects 20 having shiny surfaces and/or surfaces having no visual surface texture. In one embodiment, operation 312 is repeated using graphically differing noise projections from projectors 16 to gain additional geometry and other information about object 20 when analyzed in concert with other noise image capture set and/or other image capture sets, as will be further described below.

Figure 16:
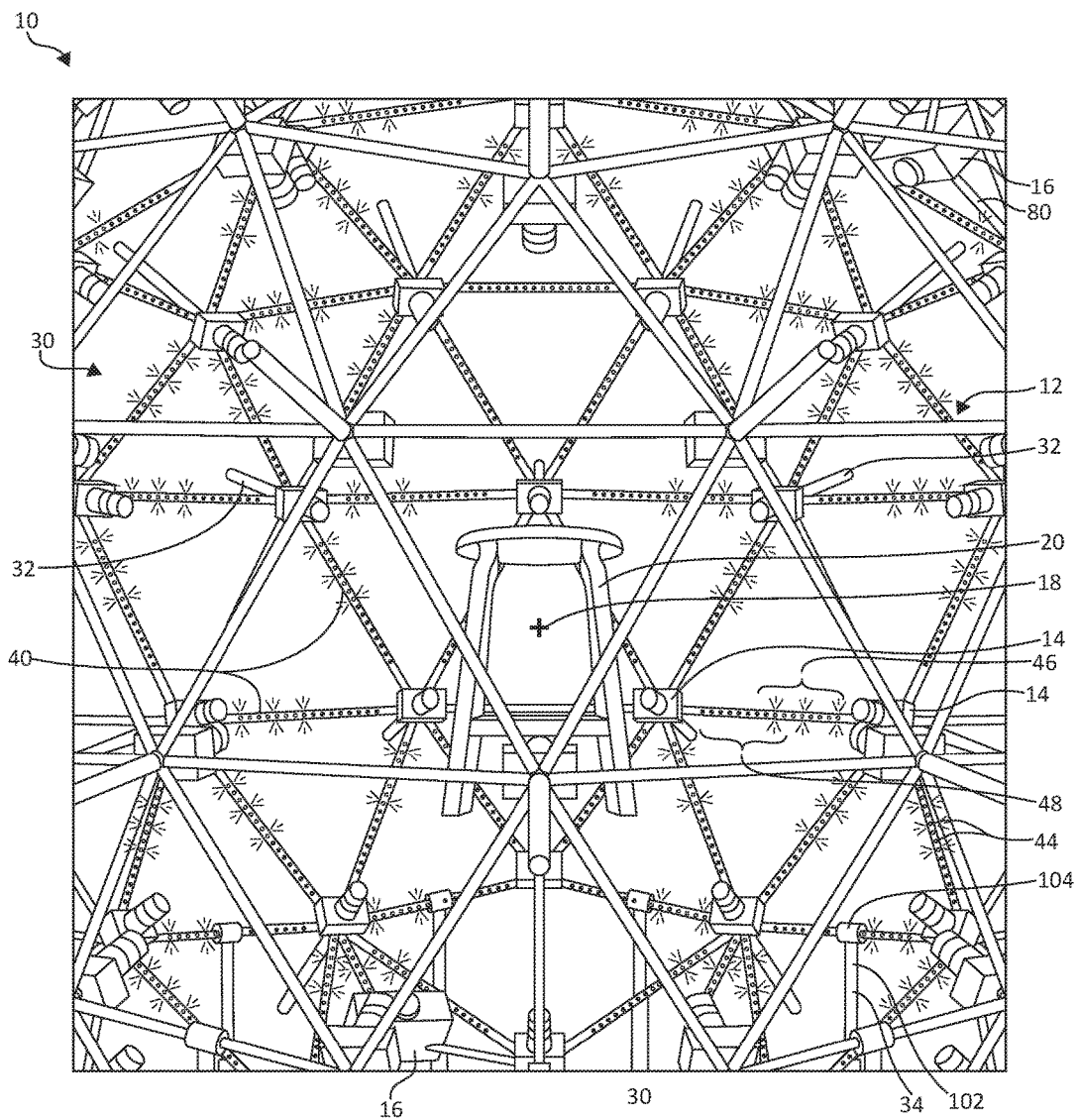

Following capture of noise image capture set at 312, at 314, projectors 16 are deactivated and non-polarized lights 46 are illuminated, while polarized lights 48 remain off as generally illustrated, for example, in FIG. 16. In this manner, object 20 is in a non-polarized light field for additional image capture. At 316, each of cameras 14 captures at least one digital image in the non-polarized light field that collectively comprises a non-polarized image capture set. More specifically, each camera 14 takes a picture of object 20 from its respective position relative to object 20 creating a digital image of object 20 while the exposed to the non-polarized light field. The non-polarized image capture set generally provides graphical and reflective image characteristics of object 20, as typically collected under standard lighting conditions, and can be layered with any texture map to produce an overall three-dimensional model having realistic visual and textural characteristics. While collecting the non-polarized image capture set is described as occurring as operation 316, any three-dimensional representation of object 20 may be generated and/or layered with any texture map, etc. Combining images in the non-polarized image capture set, generally with the use of photogrammetry software, can occur at any time during or after the process 300, such as before proceeding with a remainder of method 300, after all image capture sets for object 20 are captured, or anytime therebetween or afterwards.

Figure 17:
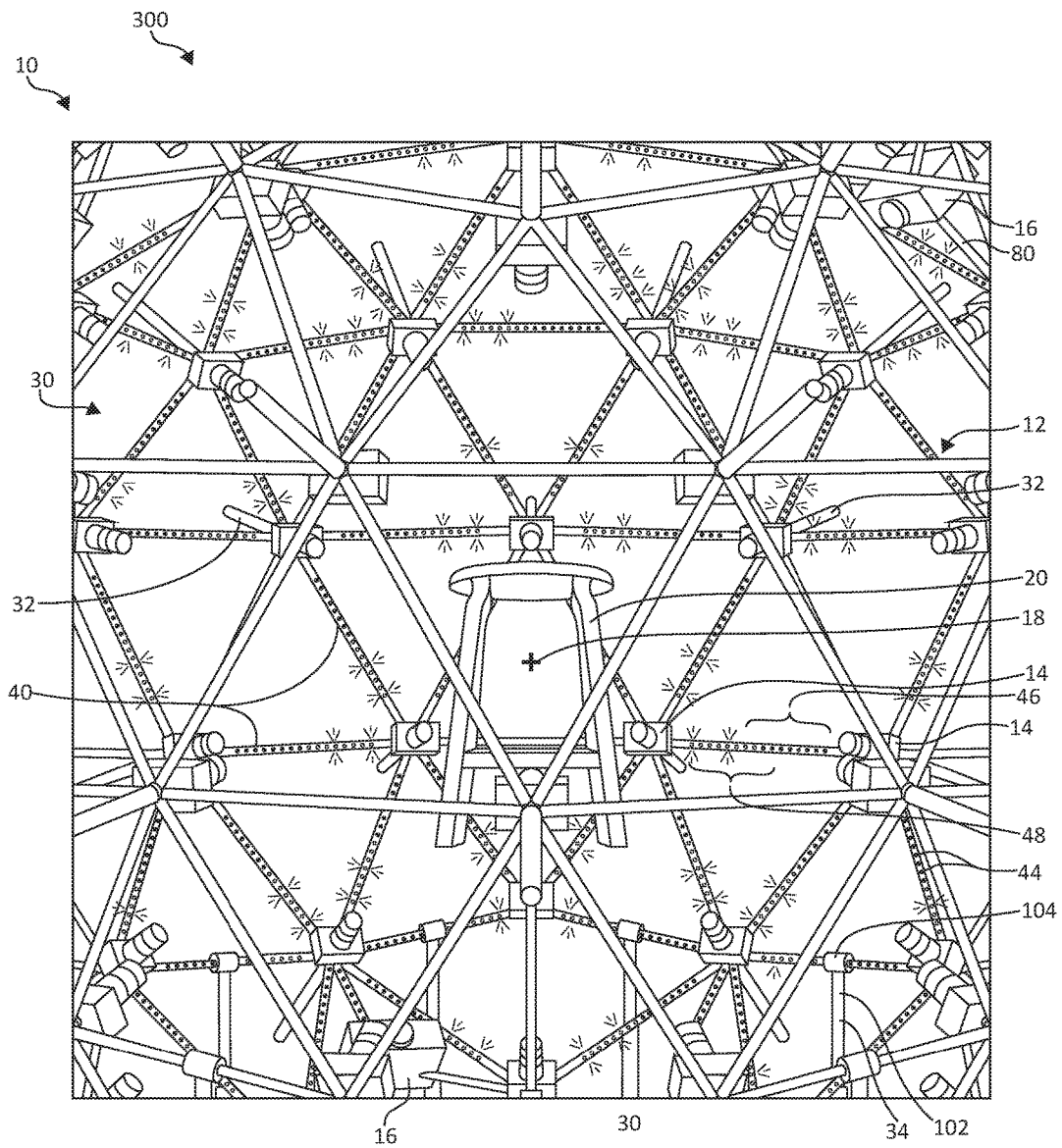

At 318, following capture of non-polarized image capture set at 316, non-polarized lights 46 are turned off, and polarized lights 48 are illuminated as generally illustrated in FIG. 17. In this manner, object 20 is placed in a polarized light field for additional image capture. Polarized light field may take on one or more forms including, but not limited to, light at a single polarization state, light at a plurality of polarization states including cross-polarized light depending upon the type of light emitted from polarized lights 48 and or any corresponding filters on cameras 14. At 320, each of cameras 14 captures at least one digital image in the polarized light field that collectively comprise a polarized image capture set. In one example, each of cameras 14 includes a filter at an opposite or cross-polarization with the polarized lights. The polarized image capture set generally provides image characteristics of object 20 with reduced specularity, that is reduced glare, bright spots, etc. caused by reflection and similar light phenomenon to again help product a three-dimensional model with a truer overall contour map and representation of object 20 absent of any or with decreased effect of any shadows, etc. typical with non-polarized light. Any three-dimensional representation built form polarized image capture set images and can be layered with any texture and/or topology map, or non-polarized image representation to produce an overall three-dimensional model having realistic visual and textural characteristics. In one embodiment, operation 320 is repeated using different polarization states during performance of operation 320. While collecting the polarized image capture set is described as occurring as operation 320, any three-dimensional representation of object 20 may be generated and/or layered with any texture and/or topology map, etc. by combining images in the non-polarized image capture set and/or polarized image capture set, generally with the use of photogrammetry software, before proceeding with a remainder of method 300, after all image capture sets for object 20 are captured, or anytime therebetween or afterwards. In one embodiment, the polarized, non-polarized, and/or cross-polarized data sets are used to compute specular surface qualities or other BxDF functions. While operations 310, 312, 314, 316, 318, and 320 are descried in one example sequence, it should be noted that the various image capture sets can be collected in any order desired. For example, non-polarized image set can be captured at 316 before noise image set is captured at 312 and/or after polarized image set is captured at 320. In one embodiment, capture of one of polarized image capture set and/or of noise image capture set is eliminated.

Once all desired image data sets are collected, then at 322, all lights 44 are illuminated to provide a fully illuminated workspace and, at 324, object 20 is unloaded from rig 12. In one example, unloading object 20 includes retracting camera support arms 32 to provide additional unimpeded work space within support frame 30 allowing object 20 to be more easily removed through bottom frame opening 50 of support frame 30. In one example, photogrammetry system 10 is near immediately reconfigured to restart method 300 with another object 20. While an order of capture images data sets is described herein, in other embodiments, the order that image capture sets are take can be rearranged and/or other image capture sets, etc. may be included and/or described image capture sets and associated method operations may be eliminated. In one embodiment, a suitable sequence of operations 310, 312, 314, 316, 318, and 320 or similar operations is automatically performed as directed by the at least one computer processor 200 (FIG. 11) upon single initiation of the method of FIG. 11 via the at least one computer processor 200.

At 328, the image capture sets collected at operations 312, 316, and/or 320 are combined by computer processors 200 to create a three-dimensional image representation of object 20. In completing operation 328, not only are images from the plurality of cameras 14 stitched together to form a three-dimensional representation that can be viewed from substantially all sides, but the images captured under various conditions, that is under non-polarized light, polarized light, and/or noise projection are compared to one another to better identified geometry (i.e., shape), texture (including color), and/or surface material characteristics, such as specularity, diffusiveness, reflectivity, dullness, shine, etc. For example, in one embodiment, non-polarized image capture set is compared to one or both of noise image capture set and at least one polarized image capture set to better identified contours, geometry, texture, surface characteristics, and other visual representations of object 20 such that the resultant three-dimensional image representation is more refined and, therefore, more accurately depicts object 20. Comparing non-polarized image capture set to one or both of noise image capture set and at least one polarized image capture and set can occur via comparison of individual images collected by the same one of cameras 14 and/or by comparing one or more models of object 20 from different photography environments to one another and/or to individual images collected in the different photography environments.

In the manner described herein and associated alternatives thereto, photogrammetry system 10 provides a rig 12 allowing for rapid collection of image capture sets following a single set up of objet 20 in photogrammetry system 10, since all cameras 14 are mounted about a substantially 360° field in a manner readily adjusted for particular object size, etc. to produce more refined three-dimensional representations of object 20. The predictability of such image capture is enhanced as more of control, etc. is automated producing less chances for human error in setting an object 20 for photo capture than prior art systems. Still further, set up of rig 12 is greatly sped up due to the adjustability of camera 14 in a direction radially extending from center focal point 18 to accommodated objects 20 of various sizes especially where support arm 32 and camera adjustments can be made via controller rather than manually.

The increased in speed collecting such images is of utmost importance where a larger number of objects need to be captured and representations made. For example, online retailers often have assortments of thousands of products and that assortment is constantly changing. Using prior image capture techniques, the cost and time associated with creating three-dimensional image representations of all such products is prohibitive. With the photogrammetry system described herein image capture sets of an object can be capture relatively quickly even when multiple types of image capture sets are used. The faster image capture makes it more manageable and cost efficient to create three dimensional image representations for all or at least for a larger number of products offered for sale by an online retailer. Similar considerations exist for any entity having a large number of objects that they require or at least desire having three-dimensional images representations for.

Although the invention has been described with respect to particular embodiments, such embodiments are meant for illustrative purposes only and should not be considered to limit the invention. Various alternatives and changes will be apparent to those of ordinary skill in the art upon reading this application. Other modifications within the scope of the invention and its various embodiments will be apparent to those of ordinary skill.

What is claimed is:

1. A method of using a photogrammetry system, the method comprising:
   placing an object in the photogrammetry system, wherein the photogrammetry system includes:
      a support frame assembled about a center focal point, the object being placed near the center focal point,
      a plurality of lights each being supported by the support frame and directed toward the center focal point, the plurality of lights including:
         a plurality of polarized lights, and
         a plurality of non-polarized lights, and
      a plurality of cameras each coupled to the support frame at a different positions, each one of the plurality of cameras having lenses directed toward the center focal point, and
      at least one computer processor in communication with each one of the plurality of cameras and the plurality of lights;
   illuminating only the plurality of polarized lights of the plurality of lights;
   substantially simultaneously capturing a polarized image of the object from each of the plurality of cameras while only the plurality of polarized lights of the plurality of lights are illuminated, the captured polarized images collectively defining a polarized image capture set;
   sending the polarized image capture set to the at least one computer processor;
   illuminating only the plurality of non-polarized lights of the plurality of lights;
   substantially simultaneously capturing a non-polarized image of the object from each of the plurality of cameras while only the non-polarized lights of the plurality of polarized lights are illuminated, the captured non-polarized images collectively defining a non-polarized image capture set;
   sending the non-polarized image capture set to the at least one computer processor; and
   using the at least one computer processor to generate a three-dimensional image representation of the object including comparing the polarized image capture set and the non-polarized image capture set to determine geometry and surface texture of the object such that the three-dimensional image representation depicts surface texture of the object about all sides of the object.

2. The method of claim 1, wherein:
   the plurality of cameras includes at least eighty cameras positioned to each capture a different angle of the object in each of the polarized image capture set and the non-polarized image capture set, such that both the polarized image capture set and the non-polarized image capture set includes images from about substantially all sides of the object.

3. The method of claim 1, wherein using the at least one computer processor to generate the three-dimensional image representation of the object uses the non-polarized image capture set to determine overall geometry of the three-dimensional image representation and uses the polarized image capture to refine one of texture and geometry of the three-dimensional image representation.

4. The method of claim 1, wherein the at least one computer processor automates the method for rapid capture of the polarized image capture set and the non-polarized image capture set, such that operations of illuminating only the plurality of polarized lights, capturing the polarized image of the object from each of the cameras, sending the polarized image capture set to the at least one computer processor, illuminating only the plurality of non-polarized lights, capturing the non-polarized image of the object from each of the cameras, and sending the non-polarized image capture set to the at least one computer processor are all automatically performed in a sequence upon receipt of a single initiation command by the at least one computer processor.

5. The method of claim 1, wherein:
the support frame is formed as a closed shape about the center focal point such that using the non-polarized image capture set with the polarized image capture set to create the three-dimensional image representation of the object is performed absent any additional polarized images taken of the object.

6. The method of claim 1, wherein:
the support frame includes a plurality of support arms evenly spaced about the support frame and each being linearly adjustable along a different radial ray from the center focal point between a position closest to the center focal point and a different position farthest away from the center focal point,
each of the plurality of cameras being coupled to an end of a different one of the plurality of support arms nearest the center focal point, and
the method further comprises adjusting the position of the plurality of support arms relative to the plurality of joint members to adjust a distance between the plurality of cameras and the object prior to capturing the polarized image capture set and the non-polarized image capture set.

7. The method of claim 1, wherein:
the support frame includes a plurality of struts arranged to collectively approximate a spherical polyhedron shape about the center focal point, the plurality of lights are arranged in a plurality of substantially linear arrays with each substantially linear array of the plurality of substantially linear arrays being coupled along a different one of plurality of struts spaced evenly about the support frame to evenly illuminate the center focal point, and
each of the plurality of cameras is supported near a different joint formed between adjacent ones of the plurality of struts such that capturing the polarized image of the object from each of the plurality of cameras captures polarized images about a plurality of sides of the object.

8. The method of claim 1, wherein the photogrammetry system further includes projectors coupled to the support frame at different positions about and directed toward the center focal point, when turned on, each of the projectors is configured to project a visual noise toward the center focal point, and the method further comprises:
projecting visual noise onto the object using the projectors,
capturing a visual noise image of the object from each of the plurality of cameras while the visual noise is projected onto the object, the visual noise images collectively defining a visual noise image capture set, and
using the visual noise image capture set with the polarized image capture set and the non-polarized image capture set to create the three-dimensional image representation of the object, wherein using the visual noise image capture set to create the three-dimensional image representation increases accuracy of the surface texture of the three-dimensional image representation as compared to the object.

9. The method of claim 8, wherein the at least one computer processor automates the method for rapid capture of the polarized image capture set and the non-polarized image capture set, such that operations of illuminating only the plurality of polarized lights, capturing the polarized image of the object from each of the cameras, sending the polarized image capture set to the at least one computer processor, illuminating only the plurality of non-polarized lights, capturing the non-polarized image of the object from each of the cameras, sending the non-polarized image capture set to the at least one computer, projecting the visual noise, capturing the visual noise images, and using the at least one computer processor to generate the three-dimensional image are all automatically performed in a sequence upon receipt of a single initiation command by the at least one computer processor.

10. The method of claim 8, wherein the visual noise is a known image pattern.

11. The method of claim 8, wherein using the at least one computer processor to generate the three-dimensional image representation of the object uses the polarized image capture set, the non-polarized image capture set, and the visual noise image capture in combination to more accurately determine at least one of the surface geometry, surface texture, and surface reflectivity of the object as compared to use of the non-polarized image capture set alone such that the resultant three-dimensional image representation is a refined depiction of the object.

12. The method of claim 8, wherein the support frame includes a plurality of struts arranged to collectively approximate a spherical polyhedron shape centered about the center focal point, the plurality of lights are supported in a series of linear arrays by the plurality of struts, the plurality of cameras are supported near joints formed between ones of the plurality of struts, and the projectors are each supported by one or more struts.

13. The method of claim 1, wherein:
the object is substantially identical to a product offered for sale on a retail web site, and
the method further comprises: displaying the three-dimensional image representation of the object on the retail website in connection with an offer to sell the product such that a potential consumer is able to manipulate the three-dimensional image on the retail website to observe all sides of the three-dimensional image.

14. A method of using a photogrammetry system, the method comprising:
placing an object in a photogrammetry rig, wherein the photogrammetry rig includes:
a support frame assembled about a center focal point, the object being placed near the center focal point, projectors coupled to the support frame at different positions about and directed toward the center focal point, when turned on, each of the projectors being configured to project a visual noise toward the center focal point, and a plurality of cameras each coupled to the support frame at a different positions, each one of the plurality of cameras having lenses directed toward the center focal point, and at least one computer processor in communication with each one of the plurality of cameras and the projectors;

capturing an initial image of the object from each of the plurality of cameras while the projectors are turned off, the initial images collectively defining an initial image capture set;

sending the initial image capture set from the plurality of cameras to the at least one computer processor;

projecting visual noise onto the object using the projectors, substantially simultaneously capturing a visual noise image of the object from each of the plurality of cameras while the visual noise is projected onto the object, the visual noise images collectively defining a visual noise image capture set, sending the visual noise image capture set from the plurality of computers to the at least one computer processor; and using the at least one computer processor to generate a three-dimensional image representation of the object including comparing the initial image capture set to the visual noise image capture set to determine geometry and surface texture of the object about all sides of the object and to produce the three-dimensional image representation depicting the geometry and surface texture of the object determined via comparison of the initial image capture set to the visual noise image capture set, wherein using the visual noise image capture set to create the three-dimensional image representation creates a refined depiction of the surface texture of the three-dimensional image representation of the object.

15. The method of claim 14, wherein:

the photogrammetry system further includes:

a plurality of lights each being supported by the support frame and directed toward the center focal point, the plurality of lights including a plurality of non-polarized lights, and the method further comprises:

illuminating only the plurality of non-polarized lights of the plurality of lights, substantially simultaneously capturing the initial image of the object from each of the cameras while only the non-polarized lights of the plurality of lights are illuminated.

16. The method of claim 15, wherein:

the initial image capture set is a non-polarized image capture set, the plurality of lights additionally includes a plurality of polarized lights, and the method further comprises:

illuminating only the plurality of polarized lights of the plurality of lights;

substantially simultaneously capturing a polarized image of the object from each of the cameras while only the polarized lights of the plurality of lights are illuminated, the captured polarized images collectively defining a polarized image capture set; and sending the polarized image capture set to the at least one computer processor;

wherein using the at least one computer processor to generate the three-dimensional image representation of the object compares the non-polarized image capture set, the visual noise image capture set, and the non-polarized image capture set to determine object geometry and surface texture of the object about all sides of the object and to create three-dimensional image representation to having refined characteristics depicting the object geometry and surface texture of the object based on the comparison of the non-polarized image capture set, the visual noise image capture set, and the non-polarized image capture set.

17. The method of claim 14, wherein:

the plurality of cameras includes at least eighty cameras positioned to each capture a different angle of the object in each of the initial image capture set and the visual noise image capture set, such that both the initial image capture set and the visual noise image capture set includes images from about substantially all sides of the object.

18. The method of claim 14, wherein the at least one computer processor automates the method for rapid capture of the initial image capture set and the visual noise image capture set, such that operations of capturing an initial image of the object from each of the plurality of cameras, sending the initial image capture set from the plurality of cameras to the at least one computer processor, projecting visual noise onto the object using the projectors, and substantially simultaneously capturing a visual noise image of the object from each of the plurality of cameras while the visual noise is projected onto the object are all automatically performed in a sequence upon single initiation of the method via the at least one computer processor.

19. The method of claim 14, wherein:

the support frame includes a plurality of support arms evenly spaced about the support frame and each being linearly adjustable along a different radial ray from the center focal point between a position closest to the center focal point and a different position farthest away from the center focal point, each of the plurality of cameras being coupled to an end of a different one of the plurality of support arms nearest the center focal point, and the method further comprises adjusting the position of the plurality of support arms relative to the plurality of joint members to adjust a distance between the plurality of cameras and the object prior to capturing the initial image capture set and the visual noise image capture set.

20. The method of claim 14, wherein:

the object is substantially identical to a product offered for sale on a retail website, and the method further comprises: displaying the three-dimensional image representation of the object on the retail website in connection with an offer to sell the product such that a potential consumer is able to manipulate the three-dimensional image on the retail website to observe all sides of the three-dimensional image.

* * * * *